US012553626B2

(12) United States Patent
Turiello

(10) Patent No.: US 12,553,626 B2
(45) Date of Patent: Feb. 17, 2026

(54) SYSTEM AND METHOD OF A LOOP ARCHITECTURE OF A FIXED PIPING SYSTEM IMPLEMENTED WITHIN A SAFETY SYSTEM OF A STRUCTURE TO CONTINUOUSLY SUPPLY BREATHABLE AIR THEREWITHIN

(71) Applicant: RESCUE AIR SYSTEMS, INC., San Carlos, CA (US)

(72) Inventor: Anthony J. Turiello, Redwood City, CA (US)

(73) Assignee: Rescue Air Systems, Inc., San Carlos, CA (US)

( * ) Notice: Subject to any disclaimer, the term of this patent is extended or adjusted under 35 U.S.C. 154(b) by 350 days.

(21) Appl. No.: 18/103,495

(22) Filed: Jan. 31, 2023

(65) Prior Publication Data

US 2024/0003561 A1 Jan. 4, 2024

Related U.S. Application Data

(60) Provisional application No. 63/358,876, filed on Jul. 7, 2022, provisional application No. 63/357,743, filed
(Continued)

(51) Int. Cl.
*F24F 7/04* (2006.01)
*F24F 11/33* (2018.01)
*F24F 11/89* (2018.01)

(52) U.S. Cl.
CPC ............ *F24F 7/04* (2013.01); *F24F 2221/50* (2013.01)

(58) Field of Classification Search
CPC .......... F24F 7/04; F24F 2221/50; F24F 11/33; F24F 11/89
See application file for complete search history.

(56) References Cited

U.S. PATENT DOCUMENTS 1,040,311 A 10/1912 Halloran
1,643,155 A 9/1927 Eisenschitz
(Continued)

FOREIGN PATENT DOCUMENTS

AR 070623 A1 4/2010
AU 2019101454 A4 1/2020
(Continued)

OTHER PUBLICATIONS

"Rescue Air for Firefighters", Published at Fire Engineering, Published on [Sep. 8, 2014] https://rescueair.com/wp-content/uploads/2020/03/rescue-air-for-firefighters.whitepaperpdf.render.pdf.
(Continued)

*Primary Examiner* — Steven S Anderson, II
(74) *Attorney, Agent, or Firm* — Foley & Lardner LLP

(57) ABSTRACT

A safety system implemented within a structure includes a source of breathable air, and a fixed piping system to supply the breathable air from the source to each level of a number of levels of the structure. The fixed piping system is implemented in a loop architecture including a first portion proximate the each level of the number of levels and a second portion farther away therefrom. In accordance with the loop architecture, the first portion and the second portion are implemented as a continuous loop with respect to the source of the breathable air such that, even during a compromise of a first sub-portion of the first portion relevant to one or more level(s) of the number of levels proximate thereto, unaffected by the compromise, the breathable air continues to be supplied to a second sub-portion of the first portion by way of the second portion.

20 Claims, 7 Drawing Sheets

Related U.S. Application Data on Jul. 1, 2022, provisional application No. 63/356,996, filed on Jun. 29, 2022.

(56) References Cited

U.S. PATENT DOCUMENTS

| | | | |
|---|---|---|---|
| 2,341,113 A | 2/1944 | Nelson | |
| 3,429,186 A | 2/1969 | Price | |
| 3,625,065 A | 12/1971 | Thompson | |
| 3,925,763 A | 12/1975 | Wadhwani et al. | |
| 4,014,216 A | 3/1977 | Thornton | |
| 4,023,146 A | 5/1977 | Carroll | |
| 4,091,874 A | 5/1978 | Monma | |
| 4,165,738 A | 8/1979 | Dyer | |
| 4,336,590 A | 6/1982 | Jaco et al. | |
| 4,373,522 A | 2/1983 | Zien | |
| 4,375,637 A | 3/1983 | Desjardins | |
| 4,380,187 A | 4/1983 | Wicks | |
| 4,413,622 A | 11/1983 | Austin | |
| 4,467,796 A | 8/1984 | Beagley | |
| 4,570,719 A | 2/1986 | Wilk | |
| 4,856,565 A | 8/1989 | Schoeffl et al. | |
| 4,862,931 A | 9/1989 | Vella | |
| 5,163,422 A | 11/1992 | Burgess | |
| 5,396,885 A | 3/1995 | Nelson | |
| 5,497,855 A | 3/1996 | Moore | |
| 5,507,283 A | 4/1996 | Grivas | |
| 5,536,690 A | 7/1996 | Greer et al. | |
| 5,564,626 A | 10/1996 | Kettler et al. | |
| 5,570,685 A | 11/1996 | Turiello | |
| 5,619,333 A | 4/1997 | Staff et al. | |
| 5,707,005 A | 1/1998 | Kettler et al. | |
| 5,720,659 A | 2/1998 | Wicks | |
| 5,746,976 A | 5/1998 | Yamada et al. | |
| 5,800,260 A | 9/1998 | Kao | |
| 5,901,758 A | 5/1999 | Hwang et al. | |
| 5,992,532 A | 11/1999 | Ramsey et al. | |
| 6,112,807 A * | 9/2000 | Dage | B60H 1/3207 236/44 C |
| 6,310,552 B1 | 10/2001 | Stumberg et al. | |
| 6,357,532 B1 | 3/2002 | Laskaris et al. | |
| 6,369,716 B1 | 4/2002 | Abbas et al. | |
| 6,401,487 B1 | 6/2002 | Kotliar | |
| 6,418,752 B2 | 7/2002 | Kotliar | |
| 6,488,026 B2 | 12/2002 | Lauer | |
| 6,502,421 B2 | 1/2003 | Kotliar | |
| 6,543,444 B1 | 4/2003 | Lewis | |
| 6,585,583 B1 * | 7/2003 | Chan | A62B 7/00 454/902 |
| 6,647,301 B1 | 11/2003 | Sederlund et al. | |
| 6,712,071 B1 | 3/2004 | Parker | |
| 6,810,910 B2 | 11/2004 | McHugh | |
| 6,832,952 B2 | 12/2004 | Faltesek et al. | |
| 6,866,102 B2 | 3/2005 | Boyce et al. | |
| 6,873,256 B2 | 3/2005 | Pedersen et al. | |
| 6,920,874 B1 | 7/2005 | Siegel | |
| 6,940,403 B2 | 9/2005 | Kail et al. | |
| 6,999,562 B2 | 2/2006 | Winick | |
| 7,091,852 B2 | 8/2006 | Mason et al. | |
| 7,100,689 B2 | 9/2006 | Williams et al. | |
| 7,124,833 B2 | 10/2006 | Sant'Angelo | |
| 7,161,481 B2 | 1/2007 | Turner | |
| 7,168,428 B1 | 1/2007 | Zoha | |
| 7,183,115 B1 | 2/2007 | Lauglin | |
| 7,186,084 B2 | 3/2007 | Bunker et al. | |
| 7,221,260 B2 | 5/2007 | Berezowski et al. | |
| 7,250,000 B2 | 7/2007 | Daniels, II | |
| 7,302,313 B2 | 11/2007 | Sharp et al. | |
| 7,347,204 B1 | 3/2008 | Lindsey et al. | |
| 7,377,835 B2 | 5/2008 | Parkulo et al. | |
| 7,395,704 B2 | 7/2008 | Difoggio | |
| 7,468,082 B2 | 12/2008 | Gordon | |
| 7,509,968 B2 | 3/2009 | Surawski | |
| 7,527,056 B2 | 5/2009 | Turiello | |
| 7,548,833 B2 | 6/2009 | Ahmed | |
| 7,568,375 B2 | 8/2009 | Sasaki et al. | |
| 7,598,856 B1 | 10/2009 | Nick et al. | |
| 7,621,269 B2 | 11/2009 | Turiello | |
| 7,654,279 B2 | 2/2010 | Horton et al. | |
| 7,658,190 B1 | 2/2010 | Phifer et al. | |
| 7,673,629 B2 | 3/2010 | Turiello | |
| 7,677,247 B2 | 3/2010 | Turiello | |
| 7,694,678 B2 | 4/2010 | Turiello | |
| 7,710,282 B1 | 5/2010 | Young | |
| 7,765,072 B2 | 7/2010 | Eiler et al. | |
| 7,770,610 B2 | 8/2010 | Lisle | |
| 7,804,402 B2 | 9/2010 | Lang et al. | |
| 7,817,050 B2 * | 10/2010 | Goodman | G01M 3/24 73/40 |
| 7,823,609 B2 | 11/2010 | Wonders | |
| 7,857,068 B2 | 12/2010 | Wagner | |
| 7,880,607 B2 | 2/2011 | Olson et al. | |
| 7,921,869 B2 | 4/2011 | Surawski | |
| 7,934,411 B2 | 5/2011 | Koch | |
| 7,953,228 B2 | 5/2011 | Faltesek et al. | |
| 7,975,729 B2 | 7/2011 | Lisle | |
| 8,038,948 B1 | 10/2011 | Laughlin | |
| 8,074,278 B2 | 12/2011 | Law et al. | |
| 8,114,954 B2 | 2/2012 | DeBruin | |
| 8,116,913 B2 | 2/2012 | Mirpourian et al. | |
| 8,147,302 B2 | 4/2012 | Desrochers et al. | |
| 8,149,109 B2 | 4/2012 | Lontka | |
| 8,196,479 B2 | 6/2012 | Ludwick et al. | |
| 8,219,249 B2 | 7/2012 | Harrod et al. | |
| 8,291,941 B1 | 10/2012 | Berardi | |
| 8,371,295 B2 | 2/2013 | Turiello | |
| 8,375,876 B2 | 2/2013 | Van Tassel | |
| 8,375,948 B2 | 2/2013 | Turiello | |
| 8,381,726 B2 | 2/2013 | Turiello | |
| 8,413,653 B2 | 4/2013 | Turiello | |
| 8,443,800 B2 | 5/2013 | Turiello | |
| 8,517,896 B2 | 8/2013 | McLoughlin et al. | |
| 8,538,687 B2 | 9/2013 | Plocher et al. | |
| 8,573,317 B2 | 11/2013 | Krüger et al. | |
| 8,602,119 B2 | 12/2013 | Wagner | |
| 8,611,323 B2 | 12/2013 | Berger et al. | |
| 8,668,023 B2 | 3/2014 | Wilkins et al. | |
| 8,701,718 B1 * | 4/2014 | Turiello | G08B 21/18 141/2 |
| 8,733,355 B2 | 5/2014 | Turiello | |
| 8,745,792 B2 | 6/2014 | McGlynn | |
| 8,755,839 B2 | 6/2014 | Parkulo et al. | |
| 8,770,190 B2 | 7/2014 | Doherty et al. | |
| 8,773,946 B2 | 7/2014 | Padmanabhan et al. | |
| 8,795,041 B2 | 8/2014 | Saito et al. | |
| 8,797,141 B2 | 8/2014 | Best et al. | |
| 8,797,210 B2 | 8/2014 | Derrick et al. | |
| 8,866,618 B2 | 10/2014 | Cotten et al. | |
| 8,995,946 B2 | 3/2015 | Miller | |
| 9,010,019 B2 | 4/2015 | Mittelmark | |
| 9,032,994 B2 | 5/2015 | McHugh et al. | |
| 9,033,061 B2 | 5/2015 | Chattaway et al. | |
| 9,105,171 B2 | 8/2015 | Flood et al. | |
| 9,109,981 B2 | 8/2015 | Sharp | |
| 9,134,284 B1 | 9/2015 | Laughlin | |
| 9,175,975 B2 | 11/2015 | Shtukater | |
| 9,220,937 B2 | 12/2015 | Wagner | |
| 9,234,661 B2 | 1/2016 | Young et al. | |
| 9,235,975 B2 | 1/2016 | Gettings et al. | |
| 9,242,126 B2 | 1/2016 | Turiello | |
| 9,243,753 B2 | 1/2016 | Wonders | |
| 9,328,936 B2 | 5/2016 | Meirav et al. | |
| 9,347,677 B2 | 5/2016 | Eberlein et al. | |
| 9,404,666 B2 | 8/2016 | Terlson et al. | |
| 9,466,199 B2 | 10/2016 | McNabb et al. | |
| 9,468,157 B2 | 10/2016 | Hu | |
| 9,564,028 B2 | 2/2017 | Cerrano | |
| 9,566,608 B2 | 2/2017 | Tran | |
| 9,670,670 B2 | 6/2017 | Teron | |
| 9,671,794 B1 | 6/2017 | Lymberopoulos et al. | |
| 9,682,257 B2 | 6/2017 | Zhao et al. | |
| 9,702,802 B2 | 7/2017 | Ajay et al. | |
| 9,724,484 B2 | 8/2017 | Robey | |
| 9,733,149 B2 | 8/2017 | Eberlein | |
| 9,829,895 B2 | 11/2017 | McLoughlin et al. | |

(56) References Cited

U.S. PATENT DOCUMENTS

| | | |
|---|---|---|
| 9,852,604 B2 | 12/2017 | Poder |
| 9,875,631 B2 | 1/2018 | Mittleman et al. |
| 9,927,066 B1 | 3/2018 | Wonders |
| 9,933,115 B2 | 4/2018 | Rado et al. |
| 9,964,470 B2 | 5/2018 | Sharp |
| 10,042,164 B2 | 8/2018 | Kuutti et al. |
| 10,044,857 B2 | 8/2018 | Philbin |
| 10,052,509 B2 | 8/2018 | Wagner |
| 10,062,233 B1 | 8/2018 | Rogers et al. |
| 10,074,295 B2 | 9/2018 | Hyman |
| 10,078,865 B2 | 9/2018 | Joshi et al. |
| 10,121,361 B2 | 11/2018 | Deluliis et al. |
| 10,124,196 B2 | 11/2018 | Roberts |
| 10,139,282 B2 | 11/2018 | Chrostowski |
| 10,156,320 B2 | 12/2018 | Toelle |
| 10,161,923 B1 | 12/2018 | Laughlin |
| 10,192,411 B2 | 1/2019 | Wedig et al. |
| 10,311,444 B1 | 6/2019 | Conboy |
| 10,380,862 B1 | 8/2019 | Heidary |
| 10,380,863 B2 | 8/2019 | Wedig et al. |
| 10,400,442 B2 | 9/2019 | Power et al. |
| 10,417,451 B2 | 9/2019 | Park et al. |
| 10,426,064 B2 | 9/2019 | Slessman et al. |
| 10,490,055 B2 | 11/2019 | Myllymäki |
| 10,503,180 B2 | 12/2019 | Blackley |
| 10,529,215 B2 | 1/2020 | Brown |
| 10,563,886 B2 | 2/2020 | McCormick et al. |
| 10,639,508 B2 | 5/2020 | Müller et al. |
| 10,738,943 B2 | 8/2020 | Tilhof |
| 10,787,803 B2 | 9/2020 | Leahy |
| 10,789,665 B2 | 9/2020 | Comello |
| 10,808,396 B2 | 10/2020 | Zhang et al. |
| 10,834,482 B2 | 11/2020 | Speicher et al. |
| 10,890,294 B2 | 1/2021 | Santos et al. |
| 10,901,373 B2 | 1/2021 | Locke et al. |
| 10,969,131 B2 | 4/2021 | Sinha et al. |
| 11,009,186 B2 | 5/2021 | Sung |
| 11,027,236 B2 | 6/2021 | Maayan et al. |
| 11,045,800 B1 | 6/2021 | Kaplan et al. |
| 11,055,973 B2 | 7/2021 | Wedig et al. |
| 11,070,390 B2 | 7/2021 | Park et al. |
| 11,111,767 B2 | 9/2021 | Anders |
| 11,135,461 B2 | 10/2021 | Beechy et al. |
| 11,162,181 B2 | 11/2021 | Harano et al. |
| 11,181,875 B2 | 11/2021 | Kummer et al. |
| 11,185,650 B2 | 11/2021 | Almqvist |
| 11,187,223 B2 | 11/2021 | Ward et al. |
| 11,191,222 B2 | 12/2021 | Cho et al. |
| 11,226,604 B2 | 1/2022 | Goyal |
| 11,238,187 B2 | 2/2022 | Nikolayev et al. |
| 11,391,474 B2 | 7/2022 | Eplee |
| 11,410,539 B2 | 8/2022 | Kasiviswanathan |
| 11,439,856 B2 | 9/2022 | Laskaris et al. |
| 11,514,764 B2 | 11/2022 | Correnti et al. |
| 11,536,476 B2 | 12/2022 | Nesler et al. |
| 11,719,625 B2 | 8/2023 | Carras et al. |
| 11,768,138 B2 | 9/2023 | Jamison et al. |
| 11,810,216 B1 | 11/2023 | Foiles et al. |
| 11,964,269 B2 | 4/2024 | Kaplan et al. |
| 12,339,267 B2 | 6/2025 | Lazea et al. |
| 12,345,433 B2 | 7/2025 | Pham et al. |
| 12,411,118 B2 | 9/2025 | McManus et al. |
| 2002/0121381 A1 | 9/2002 | Reilly |
| 2002/0185283 A1 | 12/2002 | Taylor |
| 2003/0183300 A1 | 10/2003 | Siebert |
| 2004/0045350 A1 | 3/2004 | Jones et al. |
| 2005/0066711 A1 | 3/2005 | Discenzo |
| 2006/0005880 A1 | 1/2006 | Baker et al. |
| 2006/0173579 A1 | 8/2006 | Desrochers et al. |
| 2006/0173580 A1 | 8/2006 | Desrochers et al. |
| 2006/0196254 A1 | 9/2006 | Fjerdingstad et al. |
| 2006/0234621 A1 | 10/2006 | Desrochers et al. |
| 2007/0017520 A1 | 1/2007 | Gale et al. |
| 2007/0163578 A1 | 7/2007 | Lisle |
| 2007/0175470 A1 | 8/2007 | Brookman et al. |
| 2008/0041377 A1 | 2/2008 | Turiello |
| 2008/0041378 A1 | 2/2008 | Turiello |
| 2008/0041379 A1 | 2/2008 | Turiello |
| 2008/0105443 A1 | 5/2008 | Molz et al. |
| 2008/0236846 A1 | 10/2008 | Gamble et al. |
| 2009/0159365 A1 | 6/2009 | O'Brien |
| 2009/0178675 A1 | 7/2009 | Turiello |
| 2010/0031955 A1 | 2/2010 | Turiello |
| 2010/0032040 A1 | 2/2010 | Turiello |
| 2010/0081411 A1 | 4/2010 | Montenero |
| 2010/0147297 A1 | 6/2010 | Brewer et al. |
| 2010/0154922 A1 | 6/2010 | Turiello |
| 2010/0201536 A1 | 8/2010 | Robertson et al. |
| 2011/0187524 A1 | 8/2011 | Cochran, III |
| 2011/0192479 A1 | 8/2011 | Yokota |
| 2011/0259198 A1 | 10/2011 | Kim et al. |
| 2011/0259580 A1 | 10/2011 | Head |
| 2011/0277490 A1 | 11/2011 | Meirav |
| 2012/0031525 A1 | 2/2012 | Wonders |
| 2012/0266889 A1 | 10/2012 | Roberts |
| 2013/0033377 A1 | 2/2013 | Hoseit |
| 2013/0086933 A1 | 4/2013 | Holtkamp et al. |
| 2013/0087153 A1 | 4/2013 | Jung |
| 2013/0105010 A1 | 5/2013 | McLoughlin |
| 2014/0188286 A1 | 7/2014 | Hunka |
| 2014/0232876 A1 | 8/2014 | Dougherty |
| 2014/0338927 A1 | 11/2014 | Palle |
| 2014/0349707 A1 | 11/2014 | Bang |
| 2015/0033765 A1 | 2/2015 | Blalock |
| 2015/0077737 A1 | 3/2015 | Belinsky et al. |
| 2015/0096768 A1 | 4/2015 | DuBrucq et al. |
| 2015/0130205 A1 | 5/2015 | Caskey |
| 2015/0131262 A1 | 5/2015 | Mabry |
| 2015/0170486 A1 | 6/2015 | Penland |
| 2015/0204484 A1 | 7/2015 | Modirzareh et al. |
| 2015/0217518 A1 | 8/2015 | Chun et al. |
| 2015/0330873 A1 | 11/2015 | Atchison |
| 2015/0369498 A1 | 12/2015 | Motomura et al. |
| 2016/0003524 A1 | 1/2016 | Blalock |
| 2016/0114196 A1 | 4/2016 | Tribble |
| 2016/0116181 A1 | 4/2016 | Aultman et al. |
| 2016/0133108 A1 | 5/2016 | Bucsa et al. |
| 2016/0136017 A1 | 5/2016 | Caskey |
| 2016/0138759 A1 | 5/2016 | Rado et al. |
| 2016/0197772 A1 | 7/2016 | Britt et al. |
| 2016/0334061 A1 | 11/2016 | Toelle |
| 2016/0343187 A1 | 11/2016 | Trani |
| 2017/0006107 A1 | 1/2017 | Dawes et al. |
| 2017/0084156 A1 | 3/2017 | Myllymäki |
| 2017/0122580 A1 | 5/2017 | Karamanos et al. |
| 2017/0180829 A1 | 6/2017 | Schwarzkopf et al. |
| 2017/0236397 A1 | 8/2017 | Myslenski et al. |
| 2017/0303580 A1 | 10/2017 | Cameron et al. |
| 2017/0310498 A1 | 10/2017 | Brandman et al. |
| 2018/0181094 A1 | 6/2018 | Funk et al. |
| 2018/0197393 A1 | 7/2018 | Gallo et al. |
| 2018/0200552 A1 | 7/2018 | Wertsberger |
| 2018/0243591 A1 | 8/2018 | DeWitt |
| 2018/0283614 A1 | 10/2018 | Gandolfo |
| 2018/0363939 A1 | 12/2018 | McCormick et al. |
| 2018/0375444 A1 | 12/2018 | Gamroth |
| 2019/0023529 A1 | 1/2019 | Lau |
| 2019/0103986 A1 | 4/2019 | Brandman et al. |
| 2019/0143161 A1 | 5/2019 | Burkhart et al. |
| 2019/0171780 A1 | 6/2019 | Santarone et al. |
| 2019/0174208 A1 | 6/2019 | Speicher et al. |
| 2019/0203885 A1 | 7/2019 | Sung |
| 2019/0277449 A1 | 9/2019 | Bourgeois et al. |
| 2019/0282839 A1 | 9/2019 | Wenzel et al. |
| 2020/0012307 A1 | 1/2020 | Scelzi |
| 2020/0054905 A1 | 2/2020 | Livchak et al. |
| 2020/0107475 A1 | 4/2020 | Keisling et al. |
| 2020/0143300 A1 | 5/2020 | Weldemariam et al. |
| 2020/0225313 A1 | 7/2020 | Coles |
| 2020/0232309 A1 | 7/2020 | Deutch et al. |
| 2020/0294372 A1 | 9/2020 | Rodriguez |
| 2020/0334778 A1 | 10/2020 | Lotter |
| 2020/0349661 A1 | 11/2020 | Dutta et al. |
| 2021/0023323 A1 | 1/2021 | Wilkinson et al. |

(56) References Cited

U.S. PATENT DOCUMENTS

| | | |
|---|---|---|
| 2021/0038926 A1 | 2/2021 | Reedy |
| 2021/0113864 A1 | 4/2021 | Nam |
| 2021/0183218 A1 | 6/2021 | Johnson et al. |
| 2021/0237309 A1 | 8/2021 | Tessien |
| 2021/0241595 A1 | 8/2021 | Young et al. |
| 2021/0268322 A1 | 9/2021 | Thomas et al. |
| 2021/0280034 A1 | 9/2021 | Wedig et al. |
| 2021/0297336 A1 | 9/2021 | Ramakrishnaiah et al. |
| 2021/0299495 A1 | 9/2021 | Feenstra et al. |
| 2021/0311008 A1 | 10/2021 | Hill |
| 2021/0358238 A1 | 11/2021 | Rogers et al. |
| 2021/0379429 A1 | 12/2021 | Darnell |
| 2022/0010996 A1 | 1/2022 | Carrieri |
| 2022/0019186 A1 | 1/2022 | De Andrade et al. |
| 2022/0099641 A1 | 3/2022 | Desrochers |
| 2022/0134147 A1 | 5/2022 | Webb et al. |
| 2022/0233900 A1 | 7/2022 | Williams |
| 2022/0260270 A1 | 8/2022 | Abate et al. |
| 2022/0297110 A1 | 9/2022 | Kaplan et al. |
| 2022/0404056 A1 | 12/2022 | Bloemer et al. |
| 2023/0034481 A1 | 2/2023 | Benton et al. |
| 2023/0070772 A1 | 3/2023 | Bingham et al. |
| 2023/0298346 A1 | 9/2023 | Alshammary |
| 2023/0319241 A1 | 10/2023 | Turiello et al. |
| 2025/0216034 A1 | 7/2025 | Despres et al. |

FOREIGN PATENT DOCUMENTS

| | | |
|---|---|---|
| AU | 2021105506 A4 | 11/2021 |
| CA | 2760676 A1 | 11/2010 |
| CN | 101853549 A | 10/2010 |
| CN | 101968244 A | 2/2011 |
| CN | 201775882 U | 3/2011 |
| CN | 202052220 U | 11/2011 |
| CN | 202078672 U | 12/2011 |
| CN | 202615547 U | 12/2012 |
| CN | 102739786 B | 4/2013 |
| CN | 101298769 B1 | 8/2013 |
| CN | 203154649 U | 8/2013 |
| CN | 203160791 U | 8/2013 |
| CN | 203190560 U | 9/2013 |
| CN | 102364016 B | 2/2014 |
| CN | 102500021 B | 7/2014 |
| CN | 203799482 U | 8/2014 |
| CN | 102365458 B | 9/2014 |
| CN | 104056374 A | 9/2014 |
| CN | 104826248 A | 8/2015 |
| CN | 204534128 U | 8/2015 |
| CN | 104906717 A | 9/2015 |
| CN | 205031799 U | 2/2016 |
| CN | 104260763 B | 8/2016 |
| CN | 105917208 A | 8/2016 |
| CN | 106310553 A | 1/2017 |
| CN | 106899665 A | 6/2017 |
| CN | 105143778 B | 8/2017 |
| CN | 105247269 A | 9/2017 |
| CN | 206808757 U | 12/2017 |
| CN | 107991999 A | 5/2018 |
| CN | 105892538 B | 8/2018 |
| CN | 207750720 U | 8/2018 |
| CN | 106546008 A | 9/2018 |
| CN | 105091097 B | 1/2019 |
| CN | 105547285 A | 1/2019 |
| CN | 208536257 U | 2/2019 |
| CN | 109859368 A | 6/2019 |
| CN | 109939387 A | 6/2019 |
| CN | 110469950 A | 11/2019 |
| CN | 110478804 A | 11/2019 |
| CN | 110494811 A | 11/2019 |
| CN | 110673739 A | 1/2020 |
| CN | 209926530 U | 1/2020 |
| CN | 210135667 U | 3/2020 |
| CN | 111210588 A | 5/2020 |
| CN | 210739978 U | 6/2020 |
| CN | 111544817 A | 8/2020 |
| CN | 110047240 B | 10/2020 |
| CN | 109404582 B | 11/2020 |
| CN | 112344484 A | 2/2021 |
| CN | 212491267 U | 2/2021 |
| CN | 112657081 A | 4/2021 |
| CN | 108295407 B | 5/2021 |
| CN | 111258251 A | 5/2021 |
| CN | 113365029 A | 9/2021 |
| CN | 110493568 B | 10/2021 |
| CN | 111243219 A | 11/2021 |
| CN | 214550694 U | 11/2021 |
| CN | 113769292 A | 12/2021 |
| CN | 113842716 A | 12/2021 |
| CN | 114146332 A | 3/2022 |
| CN | 114205385 A | 3/2022 |
| CN | 114235301 A | 3/2022 |
| CN | 106678991 B | 5/2022 |
| CN | 114613092 A | 6/2022 |
| CN | 216855578 U | 7/2022 |
| CN | 217526213 U | 10/2022 |
| CN | 115645769 A | 1/2023 |
| EP | 2320397 B1 | 5/2012 |
| EP | 2 982 416 A1 | 2/2016 |
| EP | 2373384 B1 | 10/2018 |
| GB | 2248884 A | 4/1992 |
| JP | H06-343709 A | 12/1994 |
| JP | H08-124064 A | 5/1996 |
| JP | 3397382 B2 | 4/2003 |
| JP | 2004-298554 A | 10/2004 |
| JP | 2005291634 A | 10/2005 |
| JP | 5117700 B2 | 1/2013 |
| JP | 5654124 B2 | 1/2015 |
| JP | 5719010 B2 | 5/2015 |
| JP | 6189404 B2 | 8/2017 |
| JP | 6321134 B2 | 5/2018 |
| JP | 2021186616 A | 12/2021 |
| JP | 7109988 B2 | 8/2022 |
| KR | 20050097400 A | 10/2005 |
| KR | 100880023 B1 | 2/2009 |
| KR | 10-2010-0012689 A | 2/2010 |
| KR | 100945260 B1 | 3/2010 |
| KR | 10-2010-0115024 A | 10/2010 |
| KR | 20110078600 A | 7/2011 |
| KR | 20110002589 U | 11/2011 |
| KR | 101088547 B1 | 12/2011 |
| KR | 101089513 B1 | 12/2011 |
| KR | 101208662 B1 | 12/2012 |
| KR | 20130017610 A | 8/2013 |
| KR | 101722045 B1 | 3/2017 |
| KR | 101747360 B1 | 6/2017 |
| KR | 101762550 B1 | 7/2017 |
| KR | 101790694 B1 | 11/2017 |
| KR | 20170138810 A | 12/2017 |
| KR | 101815533 B1 | 1/2018 |
| KR | 101841954 B1 | 3/2018 |
| KR | 101845263 B1 | 4/2018 |
| KR | 101840682 B1 | 5/2018 |
| KR | 101845264 B1 | 5/2018 |
| KR | 101859878 B1 | 5/2018 |
| KR | 101859955 B1 | 5/2018 |
| KR | 101887164 B1 | 9/2018 |
| KR | 101902976 B1 | 10/2018 |
| KR | 10-2019-0043669 A | 4/2019 |
| KR | 20180001140 U | 6/2019 |
| KR | 101996949 B1 | 7/2019 |
| KR | 102008625 B1 | 8/2019 |
| KR | 101994222 B1 | 9/2019 |
| KR | 102035835 B1 | 10/2019 |
| KR | 10-2019-0131158 A | 11/2019 |
| KR | 102050539 B1 | 12/2019 |
| KR | 10-2020-0027390 A | 3/2020 |
| KR | 102169547 B1 | 10/2020 |
| KR | 102263178 B1 | 6/2021 |
| KR | 102277919 B1 | 7/2021 |
| KR | 102300167 B1 | 9/2021 |
| KR | 102355909 B1 | 2/2022 |
| NL | 2019479 B1 | 8/2018 |
| RU | 74076 U | 6/2008 |
| RU | 2465933 C2 | 11/2012 |

(56) References Cited

FOREIGN PATENT DOCUMENTS

| | | |
|---|---|---|
| RU | 2717525 C1 | 3/2020 |
| RU | 2724093 C1 | 6/2020 |
| TW | 201425832 A | 9/2015 |
| TW | M540352 U | 4/2017 |
| WO | 2003031892 A1 | 4/2003 |
| WO | 2006047246 A2 | 5/2006 |
| WO | 2008021538 A2 | 2/2008 |
| WO | 2010063266 A1 | 6/2010 |
| WO | 2011034334 A2 | 3/2011 |
| WO | 2014208865 A1 | 12/2014 |
| WO | 2016205053 A1 | 12/2016 |
| WO | 2018038434 A1 | 3/2018 |
| WO | 2018176196 A1 | 10/2018 |
| WO | 2018236571 A1 | 12/2018 |
| WO | WO-2021/250389 A1 | 12/2021 |
| WO | 2022066099 A1 | 3/2022 |
| WO | 2023000087 A1 | 1/2023 |

OTHER PUBLICATIONS

"The Case for Interior High-Rise Breathing Air Systems", Published at Fire Engineering, Published on [Apr. 2012] https://rescueair.com/wp-content/uploads/2014/05/Rush-Article.pdf.

"RF Based Advance Smart Fire Safety System for Industries and Shopping Malls", Published at International Journal of Science and Research (IJSR), Published on [Dec. 2018] https://www.ijsr.net/archive/v7i12/ART20193898.pdf.

"Design and Implementation of Car Fire Detection and Automatic Car Door Opening Using IOT", Published at International Journal of Advances in Engineering and Management (IJAEM), Published on [ Jul. 7, 2022] https://ijaem.net/issue_dcp/Design%20and%20Implementation%20of%20Car%20Fire%20Detection%20and%20Automatic%20Car%20Door%20Opening%20Using%20Iot.pdf.

"Machine Vision Based Fire Detection Techniques: A Survey", Published at Springer Nature, Published on [Nov. 27, 2020] https://sci-hub.hkvisa.net/10.1007/s10694-020-01064-z.

"An Analysis of Firefighter Breathing Air Replenishment Systems", Published at Fire Protection Research Foundation, Published o[Apr. 2021] https://www.nfpa.org/-/media/Files/News-and-Research/Fire-statistics-and-reports/Emergency-responders/RFFAnalysisOfFFBARS.pdf.

"Fire Detection Systems in Wireless Sensor Networks", Published at World Conference on Technology, Innovation and Entrepreneurship, Published on [Jul. 3, 2015] https://www.sciencedirect.com/science/article/pii/S1877042815038872.

"Fire Safety System Building", Published at IOP Conference Series: Materials Science and Engineering, Published on [Nov. 2019] https://www.researchgate.net/publication/337402246_Fire_Safety_System_Building/fulltext/5dd573ae299bf11ec866bf2c/Fire-Safety-System-Building.pdf.

"SmartFire: Intelligent Platform for Monitoring Fire Extinguishers and Their Building Environment", Published at MDPI, Published on [May 25, 2019] https://www.mdpi.com/1424-8220/19/10/2390.

"A Smart Fire Detection System using IoT Technology With Automatic Water Sprinkler", Published at International Journal of Electrical and Computer Engineering (IJECE), Published on [Oct. 7, 2020] http://surl.li/esuhn.

"Situational Awareness for first responders: Evaluation of the BIMS field trial", Published at IEEE Xplore, Published on [Dec. 9, 2009] http://surl.li/esuid.

"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/links/5bb62f01299bf1049b6f57d7/Fire-Safety-in-Buildings.pdf.

"Ignis: Fire Detection and Mitigation System", Published at International Research Journal of Engineering and Technology (IRJET), Published on [Jun. 6, 2021 ] https://www.irjet.net/archives/V8/i6/IRJET-V8I6493.pdf.

"An Intelligent Fire Detection and Mitigation System Safe from Fire (SFF)s", Published at International Journal of Computer Applications, Published on [Jan. 2016] https://www.ijcaonline.org/research/volume133/number6/mobin-2016-ijca-907858.pdf.

"Smart Fire Alert System Using IOT", Published at International Research Journal of Modernization in Engineering Technology and Science, Published on [Mar. 3, 2022 ] https://www.irjmets.com/uploadedfiles/paper/issue_3_march_2022/20213/final/fin_irjmets1648303966.pdf.

"Johnson Controls Acquires Rescue Air Systems To Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire-suppression-portfolio-co-5246-ga-co-1665048943-ga.1665049545.pdf.

"5.07 Air Replenishment Systems (2019)", Published at San Francisco Fire Department Bureau of Fire Prevention & Investigation, Found Online on [Feb. 8, 2014] https://sf-fire.org/media/1220/download?inline.

"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.

"Firefighter Air Replenishment Systems (FARS) Air Quality Fact Sheet ", Published at Firefighter Air Coalition, Publish Online on [Feb. 8, 2014] https://aircoalition.org/wp-content/uploads/2021/03/FAC-FARS-Air-Quality-White-Paper.pdf.

"Technical Brief on System Controls for Industrial Compressed Air Systems", Published at Compressed Air And Gas Institute, Found Online on [Feb. 15, 2022] https://www.cagi.org/assets/documents/pdfs/SystemControlsTechnicalBrief.pdf?updated=1657712699.

"Case Study—System Controls", Published at Compressed Air And Gas Institute, Found Online on [Feb. 15, 2022] https://www.cagi.org/assets/documents/pdfs/SystemControlsCaseStudy.pdf?updated=1657712699.

"Technical Brief—Heat Recovery from Industrial Compressed Air Systems", Published at Compressed Air And Gas Institute, Found Online on [Feb. 15, 2022] https://www.cagi.org/assets/documents/pdfs/HeatRecoveryTechnicalBrief.pdf?updated=1657712699.

"Technical Brief on Distribution Piping Network", Published at Compressed Air And Gas Institute, Found Online on [Feb. 15, 2022] https://www.cagi.org/assets/documents/pdfs/DistributionPipingNetworkTechnicalBrief.pdf?updated=1657712699.

"Technical Brief on Pressure Drop", Published at Compressed Air And Gas Institute, Found Online on [Feb. 15, 2022] https://www.cagi.org/assets/documents/pdfs/PressureDropTechnicalBrief.pdf?updated=1657712700.

"Technical Brief on Variable Speed Drive", Published at Compressed Air And Gas Institute, Found Online on [Feb. 15, 2022] https://www.cagi.org/assets/documents/pdfs/VariableSpeedDriveTechnicalBrief.pdf?updated=1657712699.

"Compressor Room Advantages with Oil-Free Centrifugal Air Compressors", Published at Compressed Air And Gas Institute, Found Online on [Feb. 15, 2022] https://www.cagi.org/pdf/downloads/compressor-room-advantages-with-oil-free-centrifugal-air-compressors.

"Preparing Reciprocating Air Compressors for Winter", Published at Compressed Air And Gas Institute, Found Online on [Feb. 15, 2022] https://www.cagi.org/pdf/downloads/preparing-reciprocating-air-compressors-for-winter.

"Nitrogen Characteristics and Benefits of On-Site Generation", Published at Compressed Air And Gas Institute, Found Online on [Feb. 15, 2022] https://www.cagi.org/pdf/downloads/19-nitrogen-characteristics-and-benefits-of-on-site-generation.

"Key Considerations for Installing Centrifugal Air Compressors", Published at Compressed Air And Gas Institute, Found Online on [Feb. 15, 2022] https://www.cagi.org/pdf/downloads/20-key-considerations-for-installing-centrifugal-air-compressors.

"Compressed Air & Gas Handbook", Published at Compressed Air And Gas Institute, Found Online on [Feb. 15, 2022] https://www.cagi.org/handbook-pdfs/handbook-chapter-1.

(56) References Cited

OTHER PUBLICATIONS

"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.

"Fire Hazard in Buildings: Review,Assessment and Strategies For Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review-assessment-and-strategies-for-improving-fire-safety.

"Environmental Study Of Firefighters", Published at University of California, Publish on [Sep. 8, 2015] https://sci-hub.hkvisa.net/10.1093/annhyg/35.6.581.

"Summary of human responses to ventilation", Published at California Digital Library University of Clifiornia, Publish on [Jun. 1, 2004] https://escholarship.org/content/qt64k2p4dc/qt64k2p4dc.pdf.

"Fixed Fire Protection Systems in Tunnels:Issues and Directions", Published at Fire Technology, Publish on [Sep. 30, 2010] https://sci-hub.hkvisa.net/10.1007/s10694-011-0220-2.

"Comparison of Underfloor Vs. Overhead Air Distribution Systems in an Office Building", Published at Department of Architecture, Waseda University, Found Online on [Feb. 15, 2022] https://www.airfixture.com/wp-content/uploads/2016/07/ASHRAE-Underfloor-vs-Overhead-Study.pdf.

"General Requirements in piping Design", Published at RMIT University in partnership with Informit Open, Publish on [Jul. 2021] https://search.informit.org/doi/epdf/10.3316/informit.947188479100130.

"Optimal operation of heat supply systems with piping network", Published at Department of Mechanical Engineering, Osaka Prefecture University, Publish on [ Oct. 14, 2016] https://sci-hub.hkvisa.net/10.1016/j.energy.2017.03.146.

"Compressed Air Piping Network Inspection And Documentation For PAROC", Published at Turku University of Applied Sciences, Found Online on [Feb. 15, 2022] https://www.theseus.fi/bitstream/handle/10024/122415/Myllyniemi_Jani.pdf?sequence=1.

"Natural Gas Pipeline Technology Overview", Publish at Argonne National Laboratory, Publish on [ Nov. 2007] https://publications.anl.gov/anlpubs/2008/02/61034.pdf.

"Improving the indoor air quality using the individual air supply system", Publish at Int. J. Environ. Sci. Technol., Publish on [ Jul. 24, 2017] https://link.springer.com/content/pdf/10.1007/s13762-017-1432-x.pdf?pdf=button.

"Analytical Modeling of Fire Smoke Spread in High-rise Buildings", Publish at Concordia University Monreal, Quebec, Canada Publish on [ Sep. 2016] https://core.ac.uk/download/pdf/211519293.pdf.

"Chapter 6 Fire-Fighting Systems" https://www.globalsecurity.org/military/library/policy/navy/nrtc/14057_ppr_ch6.pdf.

"Research and Perspectives on Fire-Fighting Systems in Tunnels under Strong Piston Wind Action", By Xiaoyi Zhao et al., Published at Construction Management, and Computers & Digitization, Published on [Jan. 31, 2023] https://www.mdpi.com/2075-5309/13/2/435.

"Wireless sensor network applications in monitoring and control of gas networks ", By Sajad Balall Dehkordi et al., Published at Majlesi Journal of Telecommunication Devices , Published on [Jun. 23, 2012] https://mjtd.isfahan.iau.ir/article_695667_a4c0e30293098b0ac5497f27c4315bb9.pdf.

"Sustainability of Air Supply in Areas Immediately Dangerous to Life and Health", By Christopher W. Norris, Published at Northampton Fire Department,MA , Published in [Feb. 2008] https://apps.usfa.fema.gov/pdf/efop/efo41710.pdf.

"Sensor-based safety management", By Amin Asadzadeh et al., Published at Automation in Construction , Published on [Feb. 7, 2020] https://sci-hub.hkvisa.net/10.1016/j.autcon.2020.103128.

"Remote Monitoring and Control Using Mobile Phones", By Dr. Mikael Sjodin, Published at Newline Information , Published in [Nov. 2001] http://www.es.mdh.se/pdf_publications/413.pdf.

"Monitored Performance of an Office Buildingwith an Under-Floor Air Distribution System", By Christine E. Walker et al., Published at Fifth International Conference for Enhanced Building Operations, Pittsburgh, Pennsylvania , Published on [Oct. 13, 2005] https://oaktrust.library.tamu.edu/bitstream/handle/1969.1/5105/ESL-IC-05-10-13.pdf?sequence=4.

"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.

"Firefighter Fatalities in the US in 2021", By Rita F. Fahy et al., Published at National Fire Protection Association (NFPA), Published in [Aug. 2022] https://www.nfpa.org/-/media/Files/News-and-Research/Fire-statistics-and-reports/Emergency-responders/osFFF.pdf.

"Reversible Longitudinal Smoke Extraction System in Enclosed Underground Parking Structure", By KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.

"Mapping Fire and Firefighter Visibility for Improving Situational Awareness", By Katherine Ann Mistick, Published at The University of Utah ProQuest Dissertations , Published in [May 2022] https://www.proquest.com/openview/089c0ac0998979da3b550b77ddee2bf1/1?pq-origsile=gscholar&cbl=18750&diss=y.

"An ultra-wide band indoor personnel tracking system for emergency situations (Europcom)", By Anthony Putorti Jr. et al., Published at Radar Conference, 2008. EuRAD 2008. European, Published in [Dec. 2008] http://surl.li/hqxep.

"Threat modeling in smart firefighting systems: Aligning MITRE ATT&CK matrix and NIST security controls", Shahzaib Zahid et al., Published at Internet of Things, Published on [Mar. 21, 2023] https://tinyurl.com/msjusd3y.

"Autonomous Fire Suppression Systemfor Use in High and Low VisibilityEnvironments by Visual Servoing", By Joshua G. McNeil et al., Published at Fire Technology 2016, Published on [ Jan. 7, 2016] https://sci-hub.hkvisa.net/10.1007/s10694-016-0564-8.

"Breathing Limited Air Situational Training Masks (BlastMask) Versus SelfContained Breathing Apparatus (SCBA) for Firefighters: A Pilot Study", By Thomas L. Andre et al., Published at International journal of exercise science, Published in [2019] https://digitalcommons.wku.edu/cgi/viewcontent.cgi?article=2498&context=ijes.

"Internet of Things technology for fire monitoring system", By S.R.Vijayalakshmi et al., Published at International Research Journal of Engineering and Technology (IRJET), Published on [Jun. 6, 2017] https://www.irjet.net/archives/V4/16/IRJET-V416418.pdf.

"Firefighter Safety Using IoT", By Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.

"A smart fire detection system using IoT technology with automatic water sprinkler", By Hamood Alqourabah et al., Published at International Journal of Electrical and Computer Engineering (IJECE), Published on [ Mar. 5, 2021] https://pdfs.semanticscholar.org/f3e7/a7c0cf2d448be592421045033506e845e6c2.pdf.

"Route Planning for Fire Rescue Operations in Long-Term Care Facilities Using Ontology and Building Information Models", By Caroline Jebakumari S et al., Published at Building Information Modelling, Semantic Web and Internet-of-Things for Smart Cities, Published on [Jul. 21, 2022] https://www.mdpi.com/2075-5309/12/7/1060?type=check_update&version=2.

"Influence of Internal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.

"Indoor air quality in green buildings: A case-study in a residential high-rise building in the northeastern United States", Published at Journal of Environmental Science and Health, Published on [Feb. 2015] http://surl.li/fdzxk.

(56) References Cited

OTHER PUBLICATIONS

"Indoor Air-Quality Data-Monitoring System: Long-Term Monitoring Benefits", Published at MDIP, Published on [Sep. 25, 2019] https://www.mdpi.com/1424-8220/19/19/4157.
"A review of air filtration technologies for sustainable and healthy building ventilation", Published at Sustainable Cities and Society, Published on [Jul. 2017] https://core.ac.uk/download/pdf/84587706.pdf.
"A novel constant-air-volume range hood for high-rise residential buildings with 2 central shaft", Published at Energy and Buildings, Published on [May 2021] http://surl.li/feadf.
"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.
"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.
"Fire Safety", Published at Atomic Energy Regulatory Board India, Published on [May 2019] https://aerb.gov.in/images/PDF/fire.pdf.
"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.
"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.
"Review of research on air-conditioning systems and indoor air quality control for human health", Published at International Journal of Refrigeration, Published on [Jan. 2009] https://sci-hub.hkvisa.net/10.1016/j.ijrefrig.2008.05.004.
"A review of the performance of different ventilation and airflow distribution systems in buildings", Published at Building and Environment, Published on [Dec. 18, 2013] https://www.academia.edu/27228820/A_review_of_the_performance_of_different_ventilation_and_airflow_distribution_systems_in_buildings.
"Real-time sensors for indoor air monitoring and challenges ahead in deploying them to urban buildings", Published at Science of The Total Environment , Published on [Apr. 2016] https://eprints.ncl.ac.uk/file_store/production/223286/749E8E7D-D1EF-4056-BCDD-F48812167CB1.pdf.
"Indoor air quality and energy management through real-time sensing in commercial buildings", Published at Energy and Buildings, Published on [Jan. 2016] https://eprints.qut.edu.au/220977/1/93777.pdf.
"Compressors and Compressed Air Systems", Published at Continuing Education and Development, Found on [Mar. 2023] https://www.cedengineering.com/userfiles/Compressors%20and%20Compressed%20Air%20Systems%20R1.pdf.
"HVAC System", Published at Energy Conservation Building Code (ECBC) Tip Sheet, Published on [ Jun. 2009] https://www.keralaenergy.gov.in/files/HVAC_System_Tip_Sheet.pdf.
"Air distribution of oxygen supply through guardrail slot diffusers in high-altitude hypoxic areas", Published at Building and Environment, Published on [Apr. 2020] https://rb.gy/9ktde6.

"Air Quality Control in Mine Refuge Chamber with Ventilation through Pressure Air Pipeline", Published at Process Safety and Environmental Protection, Published on [Dec. 2019] https://uhra.herts.ac.uk/bitstream/handle/2299/23249/Manuscript.pdf;jsessionid=6F0E7E29FB3FF03D59759181BA6A6161?sequence=1.
International Search Report and Written Opinion for Appl. Ser. No. PCT/IB2024/050603 dated Apr. 24, 2024 (10 pages).
International Search Report and Written Opinion issued in connection with PCT/US2023/014763 dated Jun. 21, 2023 (8 pages).
International Search Report and Written Opinion issued in connection with PCT/US2023/014764 dated Jun. 23, 2023 (9 pages).
International Search Report and Written Opinion issued in connection with PCT/US2023/014765 dated Jun. 27, 2023 (10 pages).
International Search Report and Written Opinion issued in connection with PCT/US2023/017653 dated Jul. 24, 2023 (9 pages).
International Search Report and Written Opinion issued in connection with PCT/US2023/017656 dated Jul. 19, 2023 (10 pages).
International Search Report and Written Opinion issued in connection with PCT/US2023/017803 dated Jul. 24, 2023 (8 pages).
International Search Report and Written Opinion issued in connection with PCT/US2023/018401 dated Jul. 27, 2023 (10 pages).
International Search Report and Written Opinion issued in connection with PCT/US2023/019880 dated Aug. 2, 2023 (8 pages).
International Search Report and Written Opinion issued in connection with PCT/US2023/022222 dated Aug. 24, 2023 (11 pages).
International Search Report and Written Opinion issued in connection with PCT/US2023/022223 dated Sep. 4, 2023 (7 pages).
International Search Report and Written Opinion issued in connection with PCT/US2023/024766 dated Oct. 4, 2023 (7 pages).
International Search Report and Written Opinion issued in connection with PCT/US2023/025646 dated Oct. 11, 2023 (10 pages).
International Search Report and Written Opinion issued in connection with PCT/US2023/025647 dated Oct. 4, 2023 (10 pages).
International Search Report and Written Opinion issued in connection with PCT/US2023/026172 dated Oct. 31, 2023 (9 pages).
International Search Report and Written Opinion issued in connection with PCT/US2023/026174 dated Oct. 20, 2023 (7 pages).
International Search Report and Written Opinion issued in connection with PCT/US2023/026176 dated Oct. 17, 2023 (7 pages).
International Search Report and Written Opinion issued in connection with PCT/US2023/026425 dated Oct. 17, 2023 (12 pages).
International Search Report and Written Opinion issued in connection with PCT/US2023/026428 dated Oct. 17, 2023 (8 pages).
International Search Report and Written Opinion issued in connection with PCT/US2023/026466 dated Nov. 1, 2023 (8 pages).
Bhatnagar et al., "Machine Learning Techniques to Reduce Error in the Internet of Things," IEEE, 9th International Conference on Cloud Computing, Data Science & Engineering—Confluence—(pp. 403-408).
ENMET—Product Information, "Compressed Airline Monitors & Respiratory Air Monitors & Portable Breathing Air Systems," 2025 (2 pages).
Kinaeva et al., "Machine Learning Algorithms for Regression Analysis and Predictions of Numerical Data," 2021 3rd International Congress on Human-Computer Interaction, Optimization and Robotic Applications, 2021 (pp. 1-6).
Rush III, J.D., "Monitor Your Air Supply" Fire Engineering, 2014 (2 pages).
Trevino, "What Every Firefighter Needs to Know About FARS," Fire Apparatus & Emergency Equipment, 2016 (pp. 1-8).

\* cited by examiner

SYSTEM AND METHOD OF A LOOP ARCHITECTURE OF A FIXED PIPING SYSTEM IMPLEMENTED WITHIN A SAFETY SYSTEM OF A STRUCTURE TO CONTINUOUSLY SUPPLY BREATHABLE AIR THEREWITHIN

CLAIM OF PRIORITY

This application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022, U.S. Provisional Patent Application No. 63/357,743 titled CONTINUAL AIR QUALITY MONITORING THROUGH LOCALIZED ANALYSIS OF BREATHABLE AIR THROUGH A SENSOR ARRAY filed on Jul. 1, 2022, and U.S. Provisional Patent Application No. 63/358,876 titled LOOPED AIR PIPING ARCHITECTURE OF A FIREFIGHTER AIR REPLENISHMENT SYSTEM IN A HIGH RISE BUILDING TO ENABLE MULTIDIRECTIONAL FLOW TO FLOORS OF A BUILDING SUCH THAT BREATHABLE AIR TO IS DELIVERABLE TO ADJACENT FLOORS DESPITE COMPROMISED FLOORS DURING AN EMERGENCY filed on Jul. 7, 2022. The contents of each of the aforementioned applications are incorporated herein by reference in entirety thereof.

FIELD OF TECHNOLOGY

This disclosure generally relates to emergency systems and, more particularly, to systems and/or a method of a loop architecture of a fixed piping system implemented within a safety system of a structure to continuously supply breathable air therewithin.

BACKGROUND

According to the National Fire Protection Association (NFPA), most fire deaths result from smoke inhalation rather than burns. Smoke inhalation may provide for a disorientation of a human being so quick that there is little time to access clean, breathable air prior thereto. In a structure such as a multi-story building, a floor thereof compromised due to an event such as a fire incident may cause a piping system implemented as part of a supply of breathable air to emergency personnel to be compromised at not only the same floor but also one or more floor(s) above it. The compromise may also be due to the smoke rising above the compromised floor and/or other air related risks and possibilities. In order to mitigate the effects of the aforementioned compromise, the breathable air flow through the piping system may have to be shut down.

SUMMARY

Disclosed are systems and/or a method of a loop architecture of a fixed piping system implemented within a safety system of a structure to continuously supply breathable air therewithin.

In one aspect, a safety system implemented within a structure includes a source of breathable air, and a fixed piping system to supply the breathable air from the source to each level of a number of levels of the structure. The fixed piping system is implemented in a loop architecture including a first portion of the fixed piping system proximate the each level of the number of levels and a second portion of the fixed piping system farther away from the each level of the number of levels. In accordance with the loop architecture, the first portion and the second portion are implemented as a continuous loop with respect to the source of the breathable air such that, even during a compromise of a first sub-portion of the first portion of the fixed piping system relevant to one or more level(s) of the number of levels proximate thereto, unaffected by the compromise, the breathable air continues to be supplied to a second sub-portion of the first portion of the fixed piping system by way of the second portion of the fixed piping system.

In another aspect, a safety system implemented within a structure includes a source of breathable air, and a fixed piping system to supply the breathable air from the source to each level of a number of levels of the structure. The fixed piping system is implemented in a loop architecture including a first portion of the fixed piping system proximate the each level of the number of levels and a second portion of the fixed piping system farther away from the each level of the number of levels. In accordance with the loop architecture, the first portion and the second portion are implemented as a continuous loop with respect to the source of the breathable air such that, even during a compromise of a first sub-portion of the first portion of the fixed piping system relevant to one or more level(s) of the number of levels proximate thereto, unaffected by the compromise, the breathable air continues to be supplied to a second sub-portion of the first portion of the fixed piping system by way of the second portion of the fixed piping system. The safety system also includes a hardware controller to detect an event related to the compromise solely or in conjunction with a data processing device communicatively coupled thereto.

In yet another aspect, a method of a safety system implemented within a structure includes supplying breathable air from a source to each level of a number of levels of the structure through a fixed piping system, and implementing the fixed piping system in a loop architecture including a first portion of the fixed piping system proximate the each level of the number of levels and a second portion of the fixed piping system farther away from the each level of the number of levels. The method also includes, in accordance with the loop architecture, forming a continuous loop involving both the first portion and the second portion with respect to the source of the breathable air such that, even during a compromise of a first sub-portion of the first portion of the fixed piping system relevant to one or more level(s) of the number of levels proximate thereto, unaffected by the compromise, the breathable air continues to be supplied to a second sub-portion of the first portion of the fixed piping system by way of the second portion of the fixed piping system.

The methods and systems disclosed herein may be implemented in any means for achieving various aspects, and may be executed in a form of a non-transitory machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

Example embodiments, as described below, may be used to provide systems and/or a method of a loop architecture of a fixed piping system implemented within a safety system of a structure to continuously supply breathable air therewithin. Although the present embodiments have been described with reference to specific example embodiments, it will be evident that various modifications and changes may be made to these embodiments without departing from the broader spirit and scope of the various embodiments.

Figure 1:
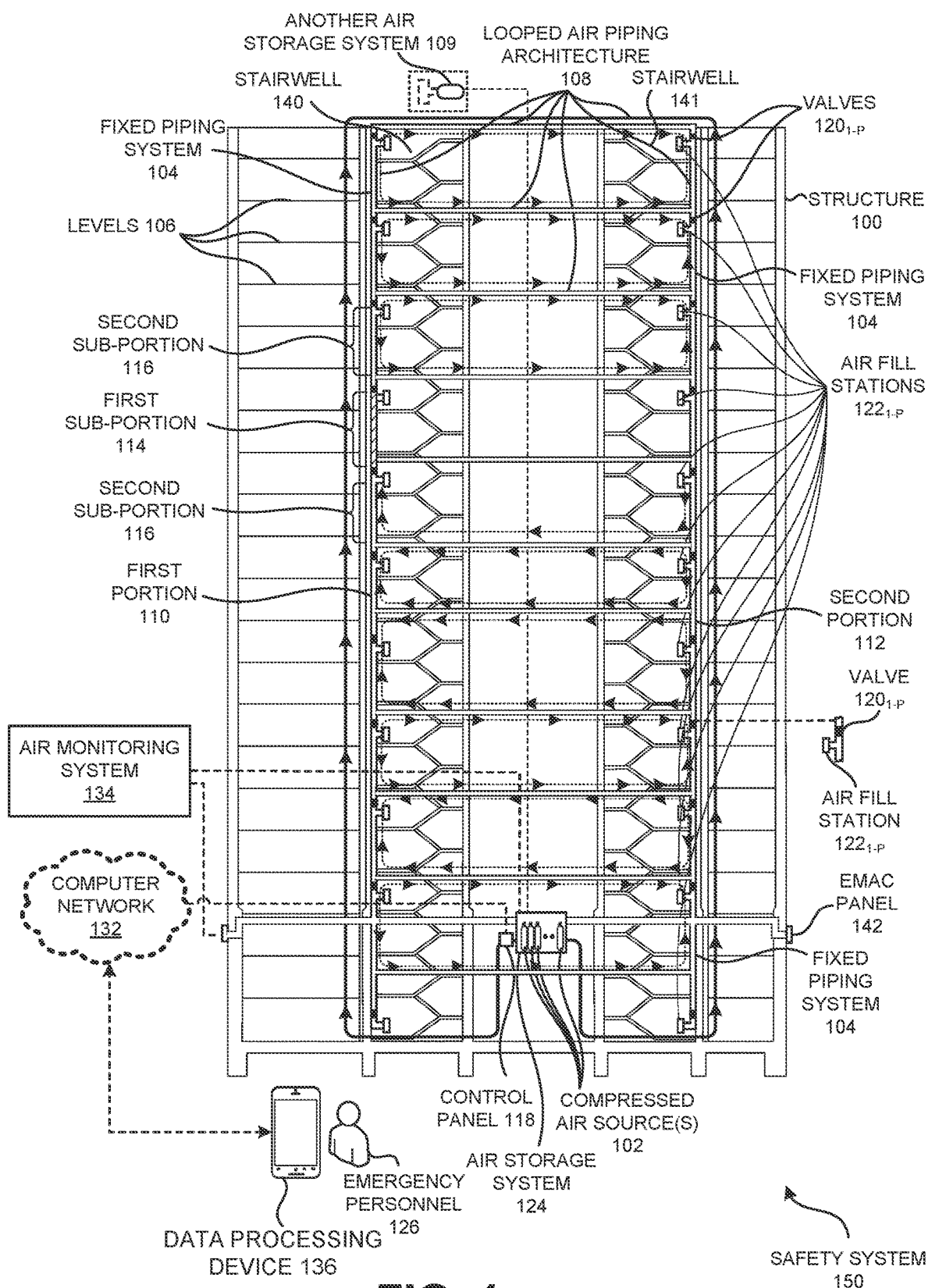
FIG. 1 is a schematic view of a safety system implemented within a structure, according to one or more embodiments.

FIG. 1 shows a safety system 150 implementing a looped air piping architecture 108 of a fixed piping system 104 within a structure 100, according to one or more embodiments. In one or more embodiments, structure 100 may be a multi-story building such as a high-rise building, a shopping mall, a hypermart and an industrial structure. Other types of structure 100 are within the scope of the exemplary embodiments discussed herein. In one or more embodiments, fixed piping system 104 of safety system 150 may include permanent air conduits installed within structure 100 serving as a constant source of replenishment of breathable air. In one or more embodiments, fixed piping system 104 may be regarded as being analogous to a water piping system within structure 100 or another structure analogous thereto for the sake of imaginative convenience. In one or more embodiments, looped air piping architecture 108 of fixed piping system 104 may include pipes (e.g., constituted out of stainless steel tubing) that distribute breathable air to a number of air fill stations $122_{1-P}$ within structure 100.

In one or more embodiments, safety system 150 may be a Firefighter Air Replenishment System (FARS) associated with structure 100. In one or more embodiments, safety system 150 may enable firefighters entering structure 100 in times of emergencies (e.g., fire-related emergencies, noxious/toxic air conditions) to gain access to breathable (e.g., human breathable) air within structure 100 without the need of bringing in additional air bottles/cylinders to be transported up several flights of stairs of structure 100 or deep thereinto, or to refill depleted air bottles/cylinders that are brought into structure 100. In one or more embodiments, safety system 150 may include one or more compressed air source(s) 102 in an air storage system 124 to supply breathable air to each level 106 (e.g., floor level) of the structure 100.

In one or more embodiments, fixed piping system 104 may include a number of linked/interlinked air pipe segments (e.g., a first sub-portion 114, a second sub-portion 116, etc.; to be discussed below) running across a number of levels 106 (e.g., floors, floor levels) of structure 100 forming a continuous loop architecture (e.g., looped air piping architecture 108) to supply breathable air. In one or more embodiments, ends of each linked air pipe segment (e.g., first sub-portion 114) of fixed piping system 104 may be interconnected with adjacent linked air pipe segments (e.g., second sub-portion 116, etc.) thereof. As shown in FIG. 1, in one or more embodiments, a first portion 110 of fixed piping system 104 may refer to the portion of fixed piping system 104 on a left side of FIG. 1 encompassing levels 106, and a second portion 112 of fixed piping system 104 may refer to a right side (e.g., farther away from the left side) of FIG. 1 also encompassing levels 106. In one or more embodiments, each of first portion 110 and second portion 112 of fixed piping system 104 may be provided proximate stairwell 140 and stairwell 141 respectively of structure 100. In general, in one or more embodiments, fixed piping system 104 may be provided within a fire-rated enclosure (e.g., stairwell 140, stairwell 141) of structure 100.

In one or more embodiments, the continuous loop architecture formed by the linked air pipe segments and the linked first portion 110 and the second portion 112 may enable multidirectional flow of breathable air through looped air piping architecture 108; in one or more embodiments, this may also build redundancy into safety system 150, as will be seen below. In one or more embodiments, each level 106 may include an air fill station $122_{1-P}$ coupled to fixed piping system 104 to provide a sufficient supply of breathable air. In one or more embodiments, each segment of fixed piping system 104 may be isolated and/or disconnected from compressed air sources 102/air storage system 124 through operation of a valve $120_{1-P}$ (e.g., an isolation valve) located adjacent to air fill station $122_{1-P}$. For example, an air fill station $122_{1-P}$ may be located at each of a basement level, a first floor level, a second floor level, and so on in a vertical multi-story building that serves as an example structure 100. It should be noted that FIG. 1, for example, shows levels 106 only on the left side thereof and air fill stations $122_{1-P}$ only on the right hand side thereof merely due to space constraints and for the sake of clarity.

In one or more embodiments, valves $120_{1-P}$ located at various levels 106 may be operable to isolate a particular air fill station $122_{1-P}$ through a control panel 118 located in structure 100 in case of a maintenance requirement and/or an emergency situation such as a fire, an accident, an explosion, a chemical attack, etc. Also, in one or more embodiments, control panel 118 may control operation of valves $120_{1-P}$ to isolate and/or disconnect a particular air fill station $122_{1-P}$ for maintenance and/or emergency situations including but not limited to air leakage, a pipe/pipe segment burst and/or failure. In one or more embodiments, control panel 118 (an example hardware controller) may be communicatively coupled to one or more data processing device(s) (e.g., data processing device 136 such as a mobile phone; other forms of data processing device 136 are within the scope of the exemplary embodiments discussed herein) through a computer network 132 (e.g., a Local Area Network (LAN), a Wide Area Network (WAN), a short-range network, a cloud computing network and/or a distributed computing network). Thus, in one or more embodiments, event detection associated with a compromise within fixed piping system 104 may be possible through both control panel 118 and data processing device 136.

In one or more embodiments, fixed piping system 104 may be implemented along one or more stairwells (e.g., stairwell 140, stairwell 141) of structure 100. FIG. 1 shows two stairwells (140, 141) of structure 100, each of which is laid out along a distinct block of structure 100, according to one or more embodiments. It is obvious that any number of stairwells is within the scope of the exemplary embodiments discussed herein.

As shown in FIG. 1, in one or more embodiments, looped air piping architecture 108 of fixed piping system 104 may distribute air from air storage system 124 including a number of compressed air sources 102 (e.g., air storage tanks) and/or another air storage system 109 (e.g., also including one or more compressed air source(s) (not shown)) that serve as sources of pressurized air. Additionally, in one or more embodiments, looped air piping architecture 108 of fixed piping system 104 may interconnect with a mobile air unit (e.g., a fire vehicle) through an External Mobile Air Connection (EMAC) panel 142. In one or more embodiments, EMAC panel 142 may be a boxed structure (e.g., exterior to structure 100) to enable the interconnection between mobile air unit and safety system 150. For example, mobile air unit may include an on-board air compressor to store and replenish pressurized and/or compressed air in air bottles/cylinders (e.g., utilizable with Self-Contained Breathing Apparatuses (SCBAs) carried by firefighters).

In one or more embodiments, an air monitoring system 134 may be installed as part of safety system 150 to automatically track and monitor a parameter (e.g., pressure) and/or a quality (e.g., indicated by a moisture level, a carbon monoxide level) of breathable air within safety system 150. FIG. 1 shows air monitoring system 134 as communicatively coupled to air storage system 124 and EMAC panel 142 merely for the sake of example. It should be noted that EMAC panel 142 may be at a remote location associated with (e.g., internal to, external to) structure 100. In one or more embodiments, for monitoring the parameters and/or the quality of breathable air within safety system 150, air monitoring system 134 include appropriate sensors and circuitries therein. For example, a pressure sensor within air monitoring system 134 may automatically sense and record the pressure of the breathable air within safety system 150. Said pressure sensor may communicate with an alarm system that is triggered when the sensed pressure is outside a safe range. Also, in one or more embodiments, air monitoring system 134 may automatically trigger a shutdown of breathable air distribution through safety system 150 in case of impurity/contaminant (e.g., carbon monoxide) detection therethrough yielding levels above a safety threshold. In certain embodiments, air monitoring system 134 may be the same as control panel 118.

Figure 2:
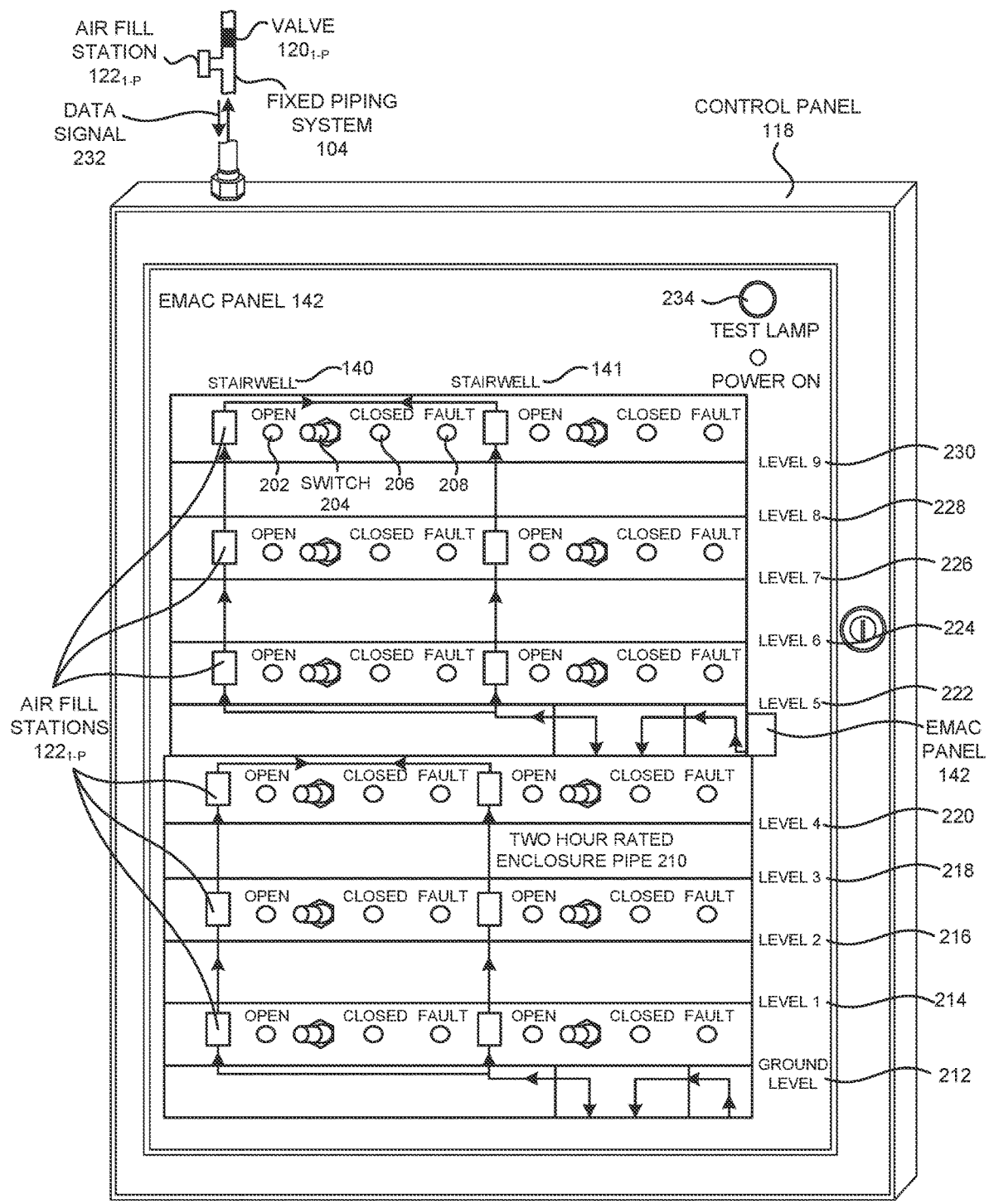
FIG. 2 is a schematic view of an example implementation of a control panel of the safety system of FIG. 1.

FIG. 2 shows control panel 118 of safety system 150, according to one or more embodiments. In one or more embodiments, control panel 118 may be a set of components working together to automatically switch ON/OFF valves $120_{1-P}$ and/or bypass particular air fill stations $122_{1-P}$ when a fault (e.g., leakage, breakdown, etc.) and/or an error is detected in looped air piping architecture 108 of fixed piping system 104. In one or more embodiments, control panel 118 may be operated by authorized personnel (e.g., emergency personnel 126 of FIG. 1); also, as discussed above, data processing device 136 communicatively coupled to control panel 118 may automatically detect events associated with looped air piping architecture 108 of fixed piping system 104.

In one or more embodiments, control panel 118 may include an array of sensors (not shown) and circuitry to activate specific valves $120_{1-P}$ and/or to isolate specific air fill stations $122_{1-P}$ from a rest of safety system 150. As shown in FIG. 2, control panel 118 may indicate a stairwell 140 and a stairwell 141, an open 202 indicator light, a closed 206 indicator light, a fault 208 indicator light, a switch 204, air fill station(s) $122_{1-P}$, EMAC panel 142, levels 106 constituted by a ground level 212, level 1 214, level 2 216, level 3 218, level 4 220, level 5 222, level 6 224, level 7 226, level 8 228, level 9 230, a two-hour rated enclosure piping 210, a data signal 232, and a lamp test 234, according to one example implementation.

In one or more embodiments, control panel 118 may indicate that both stairwell 140 and stairwell 141 are connected through loop air piping architecture 108. The open 202 indicator light may be an illuminating device commonly used to signify (e.g., through blinking) that switch 204 (e.g., isolation switch) is in an OFF state. The OFF state of switch 204 may indicate that valve $120_{1-P}$ on that particular level 106 (e.g., ground level 212, level 1 214, level 2 216 etc.) is open, according to one implementation.

The closed 206 indicator light may be an illuminating device commonly used to signify (e.g., through blinking) that switch 204 is in an ON state. The ON state of switch 204 may indicate that valve $120_{1-P}$ is closed and a corresponding fill station $122_{1-P}$ is isolated, according to one implementation. This may be implemented even for control of multiple valves $120_{1-P}$ and multiple fill stations $122_{1-P}$. As will be seen below, in one or more embodiments, the closure of an appropriate valve $120_{1-P}$ may cut off supply of breathable air to first sub-portion 114. The fault 208 indicator light may be an illuminating device commonly used to signify (e.g., through blinking) the occurrence of a faulty condition within fixed piping system 104/air fill station $122_{1-P}$ that requires immediate attention. In one or more example implementations, while actual statuses of valves $120_{1-P}$ may be reflected through, say, limit switches (not shown), control of switch 204 may control electrical coupling to open 202 indicator light, closed 206 indicator light and fault 208 indicator light. Thus, control of switch 204 may also be effected through electrical signals from said limit switches.

The switch 204 may be a device used to make or break a connection in a circuit so that emergency personnel 126 can operate (e.g., turn ON or OFF) valve $120_{1-P}$ to isolate one or more portions (e.g., first sub-portion 114) of fixed piping system 104 or a particular air fill station $122_{1-P}$. When switch 204 of a particular level 106 (e.g. ground level 212, level 1 214, level 2 216 etc.) is in the open state, it may indicate that a corresponding valve $120_{1-P}$ associated with the particular level 106 is open. When the switch 204 of the particular level 106 is in the closed state, it may indicate that the corresponding valve $120_{1-P}$ associated with the particular level 106 is closed.

In one or more embodiments, control panel 118 may receive data signals (e.g., data signal 232) from various points (e.g., joints, junctions) of looped air piping architecture 108 of fixed piping system 104 to enable detection of events associated therewith. In one or more embodiments, data signal 232 may be generated manually and/or automatically generated through sensors (not shown) in conjunction with control panel 118/data processing device 136. For example, operation of a switch 204 of a particular level 106 may make or break a connection with an associated valve $120_{1-P}$. Said connection may also be made or broken automatically with an appropriate implementation of control panel 118 and/or data processing device 136.

Test lamp 234 may be an illuminating device used to determine that control panel 118 is powered. The two-hour rated enclosure piping 210 in control panel 118 may indicate that fixed piping system 104 is enclosed within a two-hour rated enclosure piping, which may protect fixed piping system 104 against a fire hazard for two hours. All of the aforementioned details are implementation specific and serve as mere example parameters. All variations in implementation of control panel 118 are within the scope of the exemplary embodiments discussed herein.

Figure 3:
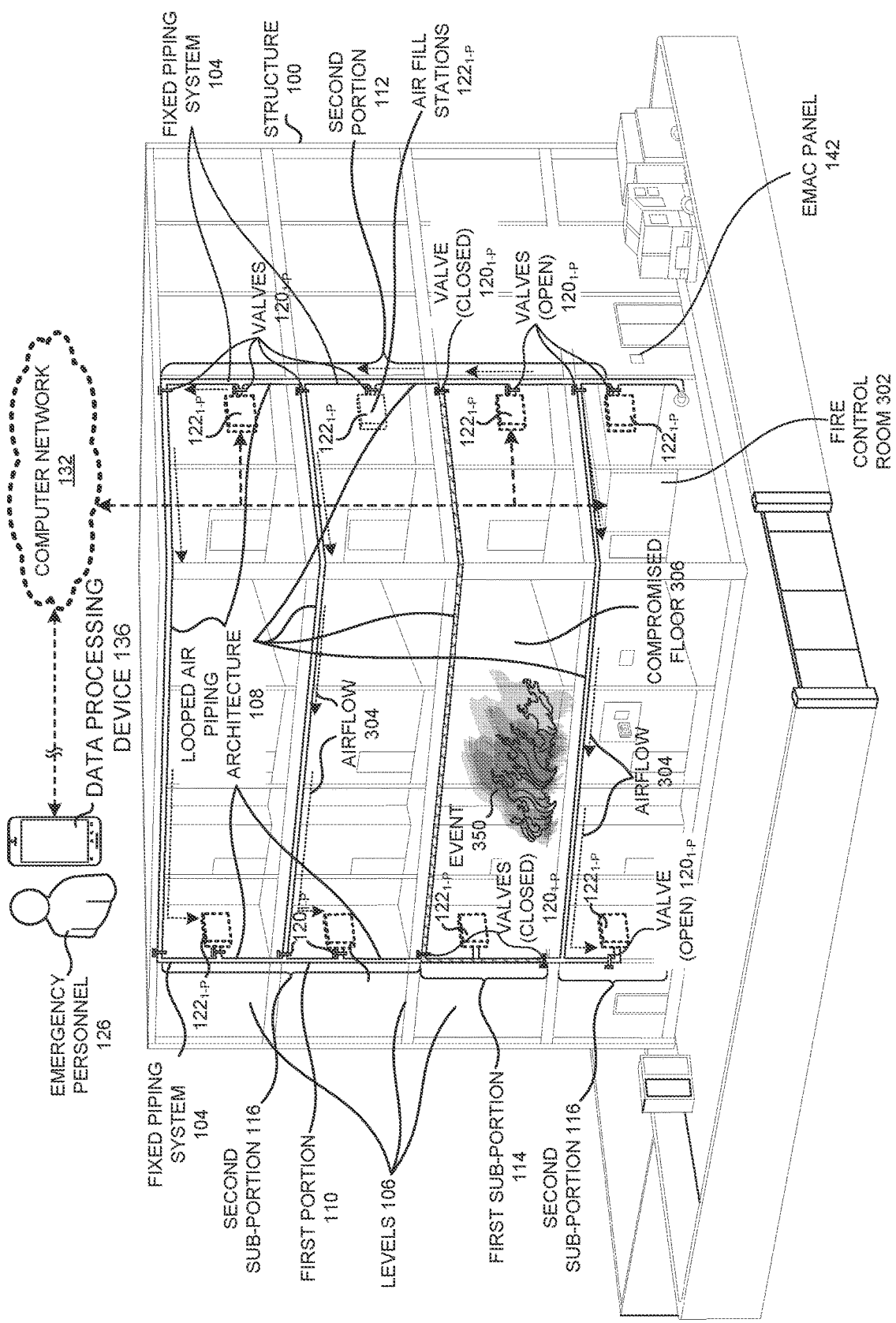
FIG. 3 is a schematic view of a context in which the safety system of FIG. 1 operates, according to one or more embodiments.

FIG. 3 shows a context in which safety system 150 of FIG. 1 operates, according to one or more embodiments. In one example scenario, an event 350 associated with a compromise of first sub-portion 114 of first portion 110 of looped air piping architecture 108 of fixed piping system 104 at a specific level 106 may occur. Examples of event 350 may include but are not limited to a fire (as shown in FIG. 3), a piping fault, a piping leak, a poor quality of breathable air, contamination of breathable air within level 106 and a chemical leak. In one or more embodiments, event 350 (e.g., a fire) may be detected through control panel 118 and/or data processing device 136 discussed above. In one or more embodiments, in accordance therewith, control panel 118 and/or data processing device 136 may cut off (e.g., automatically, manually) the breathable air to compromised first sub-portion 114 of first portion 110 based on controlling one or more valves $120_{1-P}$ associated with first sub-portion 114.

Now, in one or more embodiments, because safety system 150 has looped air piping architecture 108 implemented therein, even during the compromise of first sub-portion 114 of first portion 110 relevant to one or more levels 106 (e.g., first and second floors) proximate thereto, unaffected by the compromise, the breathable air may continue to be supplied (e.g., through air storage system 124, another air storage system 109) to second sub-portion 116 of first portion 110 of fixed piping system 104 by way of second portion 112 of fixed piping system 104. In one or more embodiments, the interlinking and/or linking of pipe segments through looped air piping architecture 108 may enable the aforementioned redundancy in breathable air supply to be implemented within safety system 150. It should be noted that certain components of safety system 150 of FIG. 1 have not been shown in FIG. 3 for the sake of illustrative clarity. However, it should be noted that all components of FIG. 1 are also relevant to FIG. 3.

The redundancy built into safety system 150 may enable emergency personnel 126 to work toward setting safety system 150 right as soon as possible with minimized difficulties during emergencies (e.g., event 350). In one or more embodiments, real-time communication between emergency personnel 126, a fire control room 302 within safety system 150 and a firefighting command center (not shown) may also be facilitated through computer network 132. In one or more embodiments, this may enable isolation of one or more air fill stations $122_{1-P}$ and closure of one or more valves $120_{1-P}$ associated with a compromised floor 306 (e.g., first sub-portion 114) from the rest of safety system 150. In one or more embodiments, emergency personnel 126 may still be able to receive a continuous supply of breathable air (e.g., airflow 304) via fill stations $122_{1-P}$ associated with the non-isolated sub-portions (e.g., second sub-portion 116) of first portion 110 by way of second portion 112 of fixed piping system 104; for example, the non-isolated sub-portions of first portion 110 may be associated with levels 106 adjacent to a level 106 of compromised floor 306.

Figure 4A:
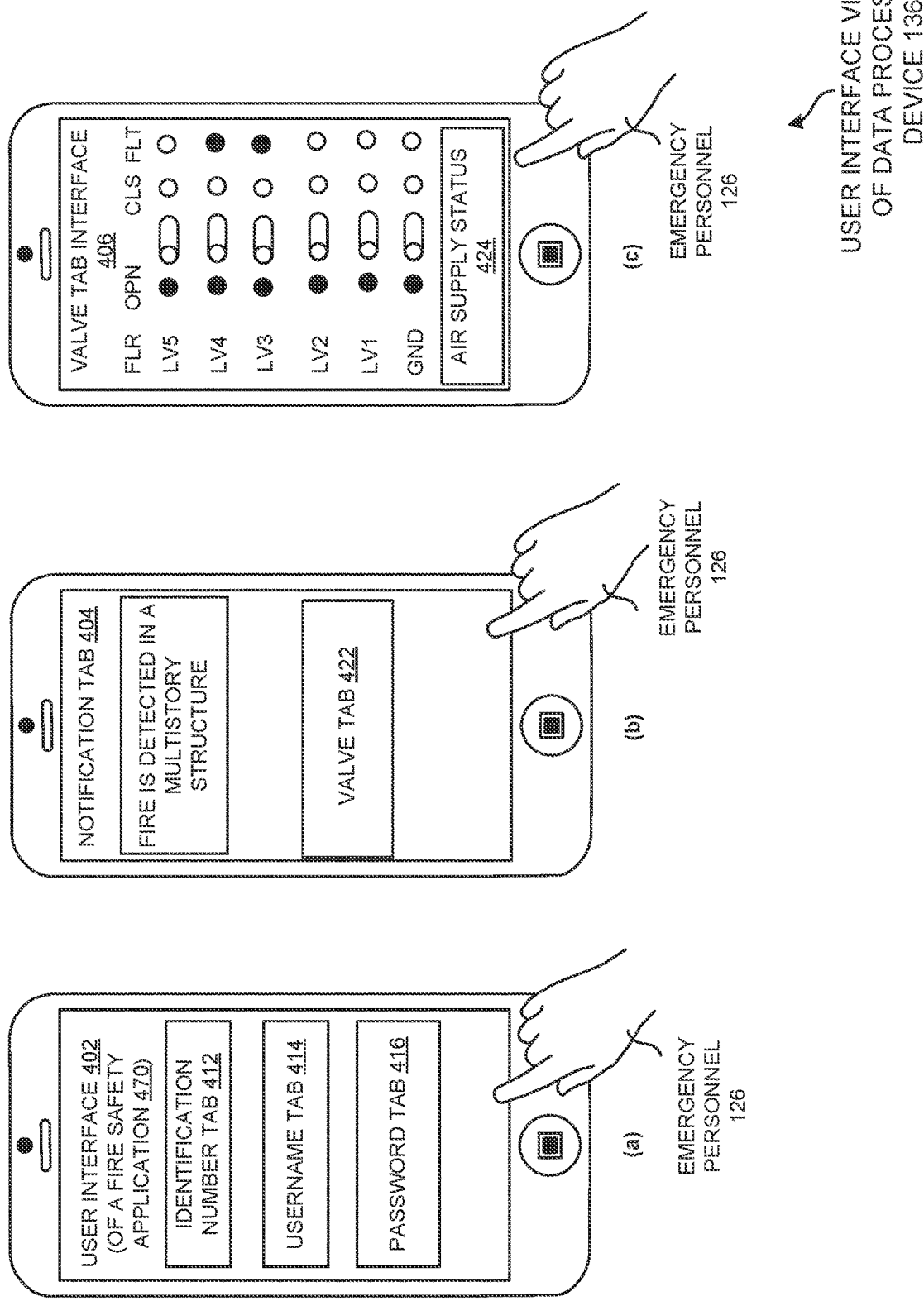
FIG. 4A is an example user interface view of a data processing device of the safety system of FIG. 1.

FIG. 4A shows an example user interface view 450A of data processing device 136 of safety system 150 of FIGS. 1 and 3. As shown in '(a)', a user interface 402 of data processing device 136 may display user authentication tabs with respect to emergency personnel 126. For example, user interface 402 may display an identification number tab 412, a username tab 414 and a password tab 416. A user (e.g., emergency personnel 126) may need to enter an identification number, a username and/or a password in order to access a fire safety application 470 executing on data processing device 136.

In one or more embodiments, user interface 402 may help the user to navigate and view different parameters and contexts of safety system 150. As shown in '(b)', the user may receive a pop-up alert notification in a notification tab 404. Notification tab 404 may indicate detection of a fire at a level 106 within structure 100. In accordance therewith, the user may click on a valve tab 422 to take necessary corrective measures. As shown in '(c)', a valve tab interface 406 may indicate one or more levels 106 in which a faulty condition (FLT) has been detected. Control valve interface 406 may also indicate whether a valve $120_{1-P}$ is open (OPN) or closed (CLS) at a particular level 106. Further, valve tab interface 406 may enable the user to check air supply status 424 of the breathable air at a particular fill station $122_{1-P}$. In FIG. 4A, valve tab interface 406 shows that all valves $120_{1-P}$ are open (OPN) and faults (FLT) have occurred in specific levels 106, viz. LV3 and LV4 (e.g., floors 3 and 4).

Figure 4B:
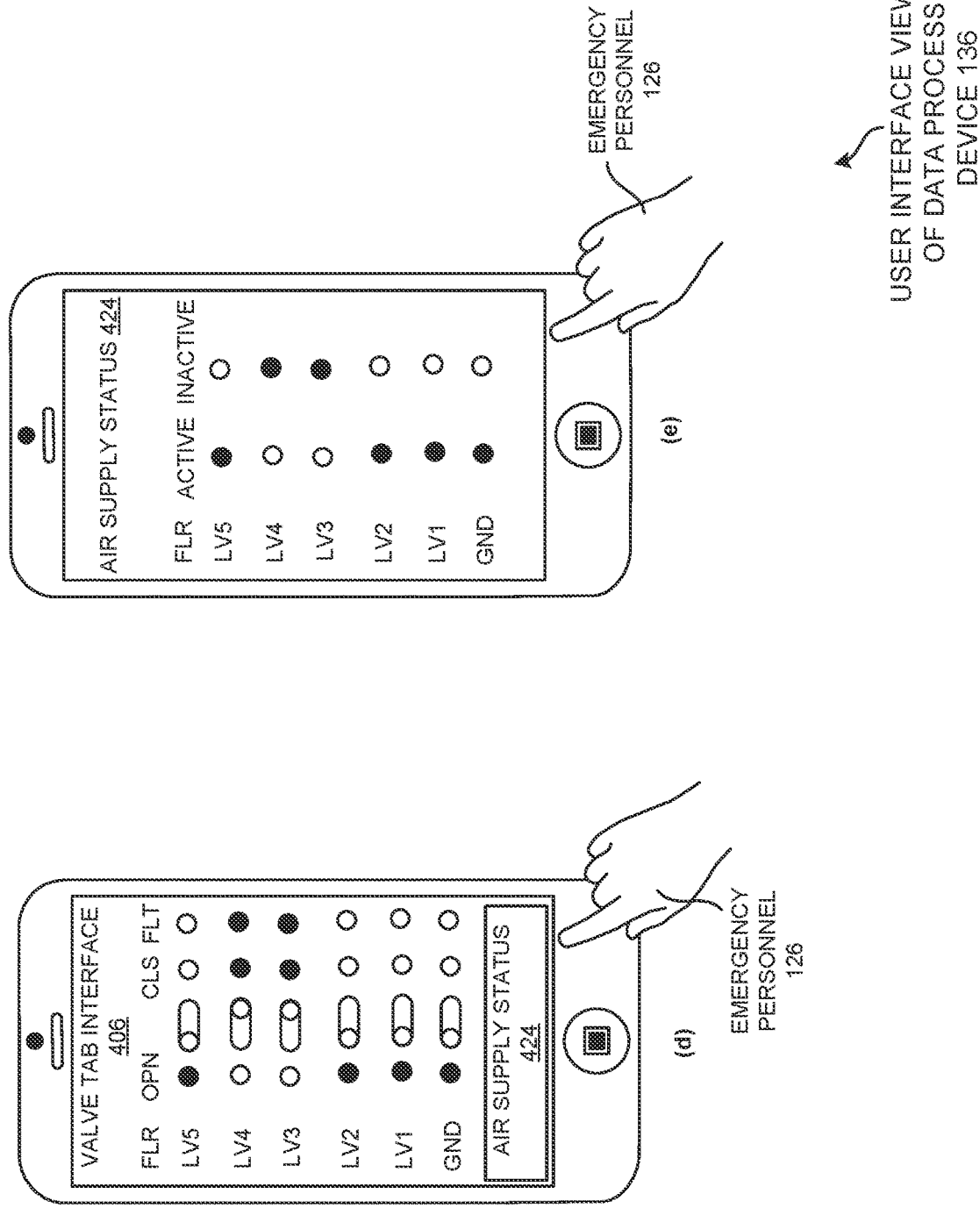
FIG. 4B is another example user interface view of the data processing device of the safety system of FIG. 1.

FIG. 4B is a continuation of FIG. 4A as user interface view 450B of data processing device 136. As shown in '(d)', valve tab interface 406 now indicates closure (e.g., through the user via valve tab interface 406) of valves $120_{1-P}$ corresponding to LV3 and LV4 in which faults have occurred. Thus, air fill stations $122b_P$ in the above specific levels 106, viz. floors 3 and 4, may be isolated. Further, the user (e.g., emergency personnel 126) may click on air supply status 424 discussed above to check the status of the breathable air supply in the corresponding air fill stations $122_{1-P}$ of levels 106 of structure 100. As shown in '(e)', air supply status 424 shows that floor GND (ground), LV1 (floor 1), LV2 (floor 2), and LV5 (floor 5) are active, which may imply that there is a continuous supply of breathable air to air fill stations $122_{1-P}$ of the ground floor, floor 1, floor 2 and floor 5 (specific levels 106) of structure 100. Further, air supply status 424 shows that LV3 and LV4 are inactive, thereby indicating that air fill stations $122_{1-P}$ of floor 3 and floor 4 of structure 100 are isolated. All reasonable variations are within the scope of the exemplary embodiments discussed herein.

Figure 5:
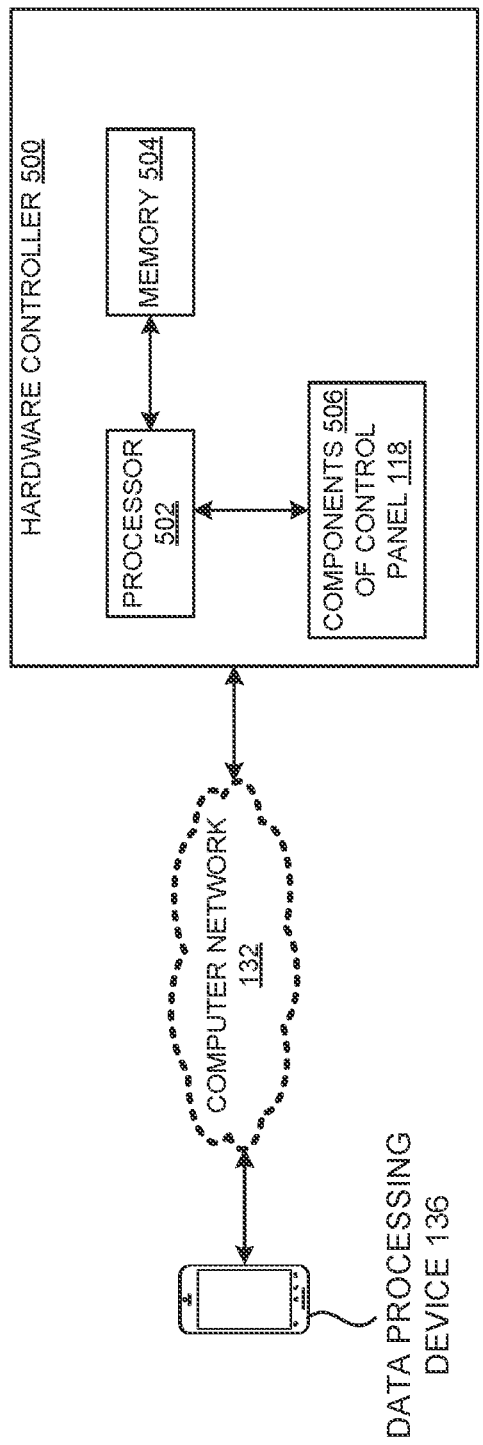
FIG. 5 is a schematic view of a hardware controller compatible with the safety system of FIG. 1, according to one or more embodiments.

FIG. 5 shows a hardware controller 500, according to one or more embodiments. In one or more embodiments, hardware controller 500 may include a processor 502 (e.g., a microprocessor, a microcontroller, a processor core, a processor) communicatively coupled to a memory 504 (e.g., a non-volatile and/or a volatile memory). In one or more embodiments, all components 506 of control panel 118 may be communicatively coupled to processor 502; in some embodiments, processor 502 may transmit signals to control components 506 and receive signals therefrom. In some embodiments, hardware controller 500 may be the same as control panel 118. As shown in FIG. 5, hardware controller 500 may be communicatively coupled to data processing device 136 through computer network 132. All concepts associated with FIGS. 1-4A/B may be applicable to hardware controller 500 of FIG. 5 and all variations therein are within the scope of the exemplary embodiments discussed herein. In the scenarios discussed above, hardware controller 500 and/or data processing device 136 may detect event 350 and, in accordance therewith, may cut off (e.g., automatically, manually) the breathable air to compromised first sub-portion 114 of first portion 110 of fixed piping system 104 based on controlling one or more valves 120$_{1-P}$ associated with first sub-portion 114.

Figure 6:
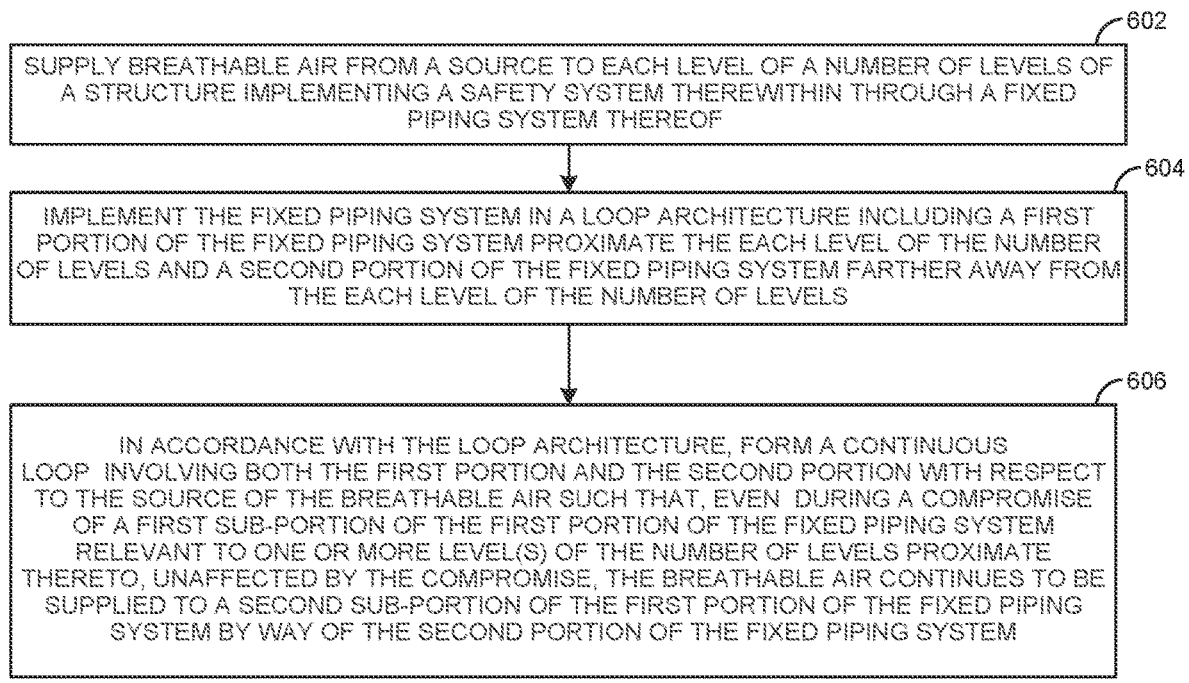
FIG. 6 is a process flow diagram detailing the operations involved in a safety system implemented with a looped air piping architecture of a fixed piping system within a structure to continuously supply breathable air therewithin, according to one or more embodiments.

FIG. 6 shows a process flow diagram detailing the operations involved in a safety system (e.g., safety system 150) implemented with a looped air piping architecture (e.g., looped air piping architecture 108) of a fixed piping system (e.g., fixed piping system 104) within a structure (e.g., structure 100) to continuously supply breathable air therewithin, according to one or more embodiments. In one or more embodiments, operation 602 may involve supplying the breathable air from a source (e.g., air storage system 124, another air storage system 109) to each level of a number of levels (e.g., levels 106) of the structure through the fixed piping system. In one or more embodiments, operation 604 may involve implementing the fixed piping system in a loop architecture (e.g., looped air piping architecture 108) including a first portion (e.g., first portion 110) of the fixed piping system proximate the each level of the number of levels and a second portion (e.g., second portion 112) of the fixed piping system farther away from the each level of the number of levels.

In one or more embodiments, operation 606 may then involve, in accordance with the loop architecture, forming a continuous loop involving both the first portion and the second portion with respect to the source of the breathable air such that, even during a compromise of a first sub-portion (e.g., first sub-portion 114) of the first portion of the fixed piping system relevant to one or more level(s) of the number of levels proximate thereto, unaffected by the compromise, the breathable air continues to be supplied to a second sub-portion (e.g., second sub-portion 116) of the first portion of the fixed piping system by way of the second portion of the fixed piping system.

Although the present embodiments have been described with reference to specific example embodiments, it will be evident that various modifications and changes may be made to these embodiments without departing from the broader spirit and scope of the various embodiments.

A number of embodiments have been described. Nevertheless, it will be understood that various modifications may be made without departing from the spirit and scope of the claimed invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

The structures and modules in the figures may be shown as distinct and communicating with only a few specific structures and not others. The structures may be merged with each other, may perform overlapping functions, and may communicate with other structures not shown to be connected in the figures. Accordingly, the specification and/or drawings may be regarded in an illustrative rather than a restrictive sense.

What is claimed is:

1. A safety system implemented within a structure comprising:
    a source of breathable air;
    a fixed piping system to supply the breathable air from the source to each level of a plurality of levels of the structure, the fixed piping system implemented in a loop architecture comprising a first portion of the fixed piping system proximate the each level of the plurality of levels and a second portion of the fixed piping system farther away from the each level of the plurality of levels relative to the first portion of the fixed piping system, and, in accordance with the loop architecture, the first portion and the second portion being implemented as a continuous loop with respect to the source of the breathable air such that, during a compromise of a first sub-portion of the first portion of the fixed piping system relevant to at least one level of the plurality of levels proximate thereto, unaffected by the compromise, the breathable air continues to be supplied to a second sub-portion of the first portion of the fixed piping system by way of the second portion of the fixed piping system; and
    a hardware controller to control an indicator light based on a detection of the compromise that corresponds to the first sub-portion of the first portion of the fixed piping system and detect a leakage associated with the loop architecture, the detection of the leakage causing the fixed piping system to automatically bypass the source of breathable air, the leakage indicating a fault at the source of breathable air.

2. The safety system of claim 1, further comprising the hardware controller to detect an event related to the compromise one of: solely and in conjunction with a data processing device communicatively coupled thereto.

3. The safety system of claim 2, wherein, in response to the detection, the at least one of: the hardware controller and the data processing device cuts off the breathable air to the first sub-portion of the first portion of the fixed piping system.

4. The safety system of claim 1, wherein the fixed piping system is implemented along at least one stairwell of the structure.

5. The safety system of claim 1, comprising at least one of:
    the safety system being implemented within a multi-story building serving as the structure, and
    the plurality of levels is a plurality of floors of the multi-story building.

6. The safety system of claim 3, wherein the at least one of: the hardware controller and the data processing device cuts off the breathable air to the first sub-portion based on controlling at least one valve associated with the first sub-portion of the first portion of the fixed piping system.

7. The safety system of claim 6, wherein at least one of:
    each of the at least one valve is proximate a fill station that provides access to the breathable air, and
    the fixed piping system is implemented within a fire-rated enclosure.

8. A safety system implemented within a structure comprising:
    a source of breathable air;
    a fixed piping system to supply the breathable air from the source to each level of a plurality of levels of the structure, the fixed piping system implemented in a loop architecture comprising a first portion of the fixed piping system proximate the each level of the plurality of levels and a second portion of the fixed piping system farther away from the each level of the plurality of levels relative to the first portion of the fixed piping system, and, in accordance with the loop architecture, the first portion and the second portion being implemented as a continuous loop with respect to the source of the breathable air such that, during a compromise of a first sub-portion of the first portion of the fixed piping system relevant to at least one level of the plurality of levels proximate thereto, unaffected by the compromise, the breathable air continues to be supplied to a second sub-portion of the first portion of the fixed piping system by way of the second portion of the fixed piping system; and a hardware controller, in conjunction with a data processing device communicatively coupled thereto, to control an indicator light based on a detection of an event related to the compromise that corresponds to the first sub-portion of the first portion of the fixed piping system and detect a leakage associated with the loop architecture, the detection of the leakage causing the fixed piping system to automatically bypass the source of breathable air, the leakage indicating a fault at the source of breathable air.

9. The safety system of claim 8, wherein, in response to the detection, the at least one of: the hardware controller and the data processing device cuts off the breathable air to the first sub-portion of the first portion of the fixed piping system.

10. The safety system of claim 8, wherein the fixed piping system is implemented along at least one stairwell of the structure.

11. The safety system of claim 8, comprising at least one of:
the safety system being implemented within a multi-story building serving as the structure, and
the plurality of levels is a plurality of floors of the multi-story building.

12. The safety system of claim 9, wherein the at least one of: the hardware controller and the data processing device cuts off the breathable air to the first sub-portion based on controlling at least one valve associated with the first sub-portion of the first portion of the fixed piping system.

13. The safety system of claim 12, wherein at least one of:
each of the at least one valve is proximate a fill station that provides access to the breathable air, and
the fixed piping system is implemented within a fire-rated enclosure.

14. A method of a safety system implemented within a structure comprising:
supplying breathable air from a source to each level of a plurality of levels of the structure through a fixed piping system;
implementing the fixed piping system in a loop architecture comprising a first portion of the fixed piping system proximate the each level of the plurality of levels and a second portion of the fixed piping system farther away from the each level of the plurality of levels relative to the first portion of the fixed piping system;
in accordance with the loop architecture, forming a continuous loop involving both the first portion and the second portion with respect to the source of the breathable air such that, during a compromise of a first sub-portion of the first portion of the fixed piping system relevant to at least one level of the plurality of levels proximate thereto, unaffected by the compromise, the breathable air continues to be supplied to a second sub-portion of the first portion of the fixed piping system by way of the second portion of the fixed piping system;
controlling, by a hardware controller, an indicator light based on a detection of the compromise that corresponds to the first sub-portion of the first portion of the fixed piping system; and
detecting, by the hardware controller, a leakage associated with the loop architecture, the detection of the leakage causing the fixed piping system to automatically bypass the source of breathable air, the leakage indicating a fault at the source of breathable air.

15. The method of claim 14, further comprising detecting, through at least one of: the hardware controller and a data processing device communicatively coupled thereto, an event related to the compromise.

16. The method of claim 15, comprising, in response to the detection, cutting off the breathable air to the first sub-portion of the first portion of the fixed piping system through the at least one of: the hardware controller and the data processing device.

17. The method of claim 14, comprising implementing the fixed piping system along at least one stairwell of the structure.

18. The method of claim 14, comprising at least one of:
the safety system being implemented within a multi-story building serving as the structure; and
the plurality of levels being a plurality of floors of the multi-story building.

19. The method of claim 15, comprising, using the at least one of: the hardware controller and the data processing device, cutting off the breathable air to the first sub-portion based on controlling at least one valve associated with the first sub-portion of the first portion of the fixed piping system.

20. The method of claim 19, comprising at least one of:
each of the at least one valve being proximate a fill station that provides access to the breathable air; and the fixed piping system being implemented within a fire-rated enclosure.

* * * * *